(12) United States Patent
Kang et al.

(10) Patent No.: US 12,532,155 B2
(45) Date of Patent: Jan. 20, 2026

(54) METHOD AND APPARATUS FOR HANDLING PROFILES BY CONSIDERING REMOVABLE eUICC SUPPORTING MULTIPLE ENABLED PROFILES

(71) Applicant: Samsung Electronics Co., Ltd., Suwon-si (KR)

(72) Inventors: Sujung Kang, Suwon-si (KR); Duckey Lee, Suwon-si (KR); Jonghoe Koo, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 898 days.

(21) Appl. No.: 17/530,308

(22) Filed: Nov. 18, 2021

(65) Prior Publication Data

US 2022/0159448 A1    May 19, 2022

(30) Foreign Application Priority Data

Nov. 19, 2020   (KR) .......................... 10-2020-0155927
Dec. 2, 2020    (KR) .......................... 10-2020-0166818
(Continued)

(51) Int. Cl.
*H04W 8/18*     (2009.01)
*H04W 8/22*     (2009.01)
*H04W 88/06*    (2009.01)

(52) U.S. Cl.
CPC ............. *H04W 8/183* (2013.01); *H04W 8/22* (2013.01); *H04W 88/06* (2013.01)

(58) Field of Classification Search
None
See application file for complete search history.

(56) References Cited

U.S. PATENT DOCUMENTS 10,776,683 B2    9/2020  Yi et al.
2018/0249322 A1*  8/2018  Kim ..................... H04W 8/183
(Continued)

FOREIGN PATENT DOCUMENTS

CN   107950041 B       4/2020
EP   3606119 A1 *      2/2020  ............ H04W 12/06
(Continued)

OTHER PUBLICATIONS

International Search Report and Written Opinion of the International Searching Authority dated Feb. 23, 2022, in connection with International Application No. PCT/KR2021/016984, 7 pages.
(Continued)

*Primary Examiner* — Jinsong Hu
*Assistant Examiner* — Alexander J Yi

(57) ABSTRACT

A method and apparatus of a user equipment (UE) for a communication technique that converges a 5G communication system for supporting a higher data rate after a 4G system with IoT technology, and a system, is provided. The method comprises: performing activation and cold reset for configuring an operating environment for a removable eUICC supporting a MEP mode; receiving an ATR message indicating whether the eUICC supports at least one eUICC functionality; determining a transport protocol based on the received ATR message; transmitting an APDU message indicating whether the UE supports eUICC-related capability; receiving a response message including a response code; determining to operating in a non-MEP mode; transmitting a command APDU message for MANAGE CHANNEL open transmitted for channel open; receiving a normal response message for generating a basic channel; and performing initialization between the eUICC and the UE.

11 Claims, 18 Drawing Sheets

(30)     Foreign Application Priority Data

Jan. 20, 2021  (KR) .......................... 10-2021-0008187
Mar. 18, 2021  (KR) .......................... 10-2021-0035291
May 20, 2021  (KR) .......................... 10-2021-0064957

(56)     References Cited

U.S. PATENT DOCUMENTS

2018/0288606 A1*  10/2018  Gao ...................... H04W 8/183
2019/0050704 A1    2/2019  Yi et al.
2019/0166488 A1    5/2019  Park et al.

FOREIGN PATENT DOCUMENTS

| EP | 3261370 B1 | | 3/2020 | |
|---|---|---|---|---|
| KR | 10-2006-0024852 A | | 3/2006 | |
| KR | 101075638 B1 | * | 3/2006 | ........... H04B 1/3816 |
| WO | 2017082966 A1 | | 5/2017 | |

OTHER PUBLICATIONS

Supplementary European Search Report dated Mar. 20, 2024, in connection with European Application No. 21895125.9, 6 pages.
ETSI TS 102 223 V15.3.0 (Jul. 2019), Smart Cards; Card Application Toolkit (CAT) (Release 15), Jul. 2019, 250 pages.
ETSI TS 103 384 V1.0.0 (Jun. 2018), Smart Cards; Embedded UICC; Technical Specification (Release 14), Jun. 2018, 52 pages.
GSM Association, Remote Provisioning Architecture for Embedded UICC Test Specification, Version 4.2, Jul. 2020, 804 pages.

* cited by examiner

METHOD AND APPARATUS FOR HANDLING PROFILES BY CONSIDERING REMOVABLE eUICC SUPPORTING MULTIPLE ENABLED PROFILES

CROSS-REFERENCE TO RELATED APPLICATIONS

This application is based on and claims priority under 35 U.S.C. § 119 to Korean Patent Application No. 10-2020-0155927 filed on Nov. 19, 2020, Korean Patent Application No. 10-2020-0166818 filed on Dec. 2, 2020, Korean Patent Application No. 10-2021-0008187 filed on Jan. 20, 2021, Korean Patent Application No. 10-2021-0035291 filed on Mar. 18, 2021, and Korean Patent Application No. 10-2021-0064957 filed on May 20, 2021, in the Korean Intellectual Property Office, the present disclosures of which are herein incorporated by reference in their entirety.

BACKGROUND

1. Field

The present disclosure relates to a method and an apparatus for downloading at least one communication service to a terminal and installing and enabling the same in a wireless communication system such that communication connection is established. Particularly, the present disclosure relates to a method for processing profiles between a terminal and an eUICC supporting multiple enabled profiles (MEP) to this end.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post long term evolution (Post LTE)" system. The 5G communication system is considered to be implemented in higher frequency (mm-Wave) bands (e.g., 60 GHz bands), so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on evolved small cells, advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply existing 4G and 5G communication systems to IoT networks. For example, technologies such as a sensor network, machine-to-machine (M2M) communication, machine type communication (MTC), and may be implemented by beamforming, MIMO, and array antennas techniques that are 4G and 5G communication technologies.

A universal integrated circuit card (UICC) is a smart card inserted and used in a mobile communication terminal or the like, and is also referred to as a UICC card. The UICC may include an access control module for accessing a network of a mobile communication provider. Examples of the access control module include a universal subscriber identity module (USIM), a subscriber identity module (SIM), an IP multimedia service identity module (ISIM), and the like. A UICC including a USIM is commonly also referred to as a USIM card. Similarly, a UICC including a SIM module is also commonly referred to as a SIM card. In the following description of the present disclosure, "SIM card" may be used in the conventional sense encompassing a UICC card, a USIM card, a UICC including an ISIM, and the like. In other words, the technical application of a SIM card can be equally applied to a USIM card, an ISIM card, or a general UICC card.

The SIM card is used to store personal information of a mobile communication subscriber, to authenticate the user when accessing a mobile communication network, and to generate a traffic security key such that mobile communication can be used safely.

The SIM card is generally manufactured as a dedicated card for a specific mobile communication provider at the request of the corresponding provider, and authentication information for accessing the network of the provider (for example, USIM application, international mobile subscriber identity (IMSI), K value, OPc value) are pre-installed in the card, which is then commercially available. Therefore, the manufactured SIM card is delivered to the corresponding mobile communication provider and then provided to the subscriber and, if necessary, a technology such as over the air (OTA) may be later used to install an application in the UICC, modify the same, delete the same, or otherwise manage the same. By inserting the UICC card into the mobile communication terminal in possession, the subscriber can use the network of the corresponding mobile communication provider and application services. When the terminal is to be replaced, the UICC card may be removed from the existing terminal and inserted into a new terminal such that the same authentication information, mobile communication telephone numbers, personal telephone directory, and the like stored in the UICC can be used in the new terminal.

However, the SIM card may inconvenience the mobile communication terminal user when receiving a service from another mobile communication provider. In other words, a mobile communication terminal user needs to physically acquire a SIM card to receive a service from a corresponding mobile communication provider. For example, when a person travels to another nation, a local SIM card needs to be obtained to use the local mobile communication service. Such inconvenience may be resolved to some extent by using a roaming service, but there is also a problem in that the same is expensive, and no service can be provided without a contact between the providers.

Such inconvenience may be resolved to a considerable extent by remotely downloading the SIM module and installing the same in the UICC card. That is, the SIM module of the mobile communication service to be used may be downloaded to the UICC card at a timepoint desired by the user. In addition, multiple SIM modules may be downloaded and installed to such a UICC card, and only a single SIM module among the same may be selected and used. Such a UICC card may or may not be fixed to the terminal. Particularly, a UICC fixed to a terminal and used as such is referred to as an eUICC (embedded UICC). In general, an eUICC refers to a UICC card which is fixed to a terminal and used as such, and which is configured such that a SIM module can be remotely downloaded and selected. In the present disclosure, a UICC card configured such that a SIM module can be remotely downloaded and selected may be referred to as an eUICC. In other words, among UICC cards configured such that a SIM module can be remotely downloaded and selected, UICC cards fixed to terminals and UICC cards not fixed thereto may both be referred to as eUICC. In addition, downloaded SIM module information will hereinafter be referred to as a profile.

Even when more than one profiles exist in the eUICC, only one can be simultaneously enabled. Therefore, if a terminal supports two basebands, and even if two or more profiles exist in the corresponding eUICC, the terminal cannot support a dual SIM function that enables simultaneous use of two profiles in a single mobile phone. This may be solved by mounting two eUICCs in the terminal, but this requires an additional eUICC module to be mounted and a physical interface for connecting the eUICC module to the baseband of the modem. Thus, the terminal manufacturer has a burden of costs for the additional eUICC module and physical pins for the physical interface. There is also a problem of having to secure a space in the terminal to mount the corresponding module and physical pins.

SUMMARY

When an eUICC that supports multiple enabled profiles (MEP) such that multiple profiles can be enabled is inserted into a terminal, a method for profile processing needs to be determined in connection with the number of profiles that are to remain enabled by the terminal, the eUICC, or both the terminal and the eUICC, or profiles to be disabled, and operations need to be processed differently according thereto. However, there is currently no consideration thereof, and this problem needs to be solved.

Particularly, when a removable MEP-supporting eUICC is inserted into a terminal, and a profile having a "disabling impossible" business provider policy (profile policy rule 1 (PPR1)) configured in metadata is inserted into the eUICC, there is no consideration regarding a method for handling the corresponding profile by the terminal or the MEP-supporting eUICC. This problem needs to be solved.

According to the present disclosure, a method of a user equipment (UE) is provided. The method comprises: performing activation and cold reset for configuring an operating environment for operation with a removable embedded universal integrated circuit card (eUICC) supporting a multiple enabled profiles (MEP) mode; receiving, from the eUICC, an answer to reset (ATR) message including information indicating whether the eUICC supports at least one eUICC functionality in response to performing the activation and the cold reset; determining a transport protocol to be used between the UE and the eUICC based on the received ATR message; transmitting, to the eUICC, an application protocol data unit (APDU) message including information indicating whether the UE supports eUICC-related capability through the transport protocol to be used between the UE and the eUICC; receiving, from the eUICC, a response message including a response code in response to transmitting the APDU message; determining to operating in a non-MEP mode; transmitting, to the eUICC, a command APDU message for MANAGE CHANNEL open transmitted for channel open at a time of initialization between a general eUICC not supporting the MEP mode and the UE; receiving, from the eUICC, a normal response message for generating a basic channel between the UE and the eUICC for APDU transmission in response to transmitting the command APDU message; and performing initialization between the eUICC and the UE.

According to an embodiment of the present disclosure, the method of a removable embedded universal integrated circuit card (eUICC) supporting a multiple enabled profiles (MEP) mode is provided. The method comprises: transmitting, to a user equipment (UE), an answer to reset (ATR) message for activation and cold reset of the UE, the ATR message including information indicating whether the eUICC supports at least one eUICC functionality; receiving, from the UE, an application protocol data unit (APDU) message including information indicating whether the UE supports eUICC-related capability through a transport protocol to be used between the UE and the eUICC determined based on the ATR message; transmitting, to the UE, a response message including a response code in response to receiving the APDU message; determining whether the UE supports eUICC-related capability based on the APDU message; if the UE does not support eUICC-related capability, determining that the UE operates in non-MEP mode; if the UE supports eUICC-related capability, determining whether the eUICC receives, from the UE, a command APDU message for MANAGE CHANNEL open transmitted for channel open at a time of initialization between a general eUICC not supporting the MEP mode and the UE; if the eUICC receives, from the UE, the command APDU message, determining that the UE operates in the non-MEP mode and transmitting, to the UE, a normal response message for generating a basic channel between the UE and the eUICC for APDU transmission in response to receiving the command APDU message; performing initialization between the eUICC and the UE.

According to an embodiment of the present disclosure, A user equipment (UE) comprises: a transceiver; and a controller coupled to the transceiver, wherein the controller is configured to: perform activation and cold reset for configuring an operating environment for operation with a removable embedded universal integrated circuit card (eUICC) supporting a multiple enabled profiles (MEP) mode; receive, from the eUICC, an answer to reset (ATR) message including information indicating whether the eUICC supports at least one eUICC functionality in response to performing the activation and the cold reset; determine a transport protocol to be used between the UE and the eUICC based on the received ATR message; transmit, to the eUICC, an application protocol data unit (APDU) message including information indicating whether the UE supports eUICC-related capability through the transport protocol to be used between the UE and the eUICC; receive, from the eUICC, a response message including a response code in response to transmitting the APDU message; determine to operating in a non-MEP mode; transmit, to the eUICC, a command APDU message for MANAGE CHANNEL open transmitted for channel open at a time of initialization between a general eUICC not supporting the MEP mode and the UE; receive, from the eUICC, a normal response message for generating a basic channel between the UE and the eUICC for APDU transmission in response to transmitting the command APDU message; and perform initialization between the eUICC and the UE.

According to an embodiment of the present disclosure, a removable embedded universal integrated circuit card (eUICC) supporting a multiple enabled profiles (MEP) mode is configured to transmit, to a user equipment (UE), an answer to reset (ATR) message for activation and cold reset of the UE, the ATR message including information indicating whether the eUICC supports at least one eUICC functionality; receive, from the UE, an application protocol data unit (APDU) message including information indicating whether the UE supports eUICC-related capability through a transport protocol to be used between the UE and the eUICC determined based on the ATR message; transmit, to the UE, a response message including a response code in response to receiving the APDU message; determine whether the UE supports eUICC-related capability based on the APDU message; if the UE does not support eUICC-related capability, determine that the UE operates in non-MEP mode; if the UE supports eUICC-related capability, determine whether the eUICC receives, from the UE, a command APDU message for MANAGE CHANNEL open transmitted for channel open at a time of initialization between a general eUICC not supporting the MEP mode and the UE; if the eUICC receives, from the UE, the command APDU message, determine that the UE operates in the non-MEP mode and transmit, to the UE, a normal response message for generating a basic channel between the UE and the eUICC for APDU transmission in response to receiving the command APDU message; and perform initialization between the eUICC and the UE An embodiment of the present disclosure provides a method wherein, when a user inserts a MEP removable eUICC having one or more profiles enabled into an eSIM terminal which does not support eUICC or, which does not support the MEP mode, one can be selected from the enabled profiles.

According to an embodiment of the present disclosure, during initialization between a terminal and a card in the MEP mode, baseband connection regarding a default profile can be guaranteed, and a profile having profile policy rule 1 (PPR1) configured therein may be guaranteed to remain enabled.

An embodiment of the present disclosure provides a method wherein, in connection with a baseband currently occupied by a profile that cannot be disabled in the MEP mode, the user can swap the connection to another profile and use the same, or connect to another UICC and use the same.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
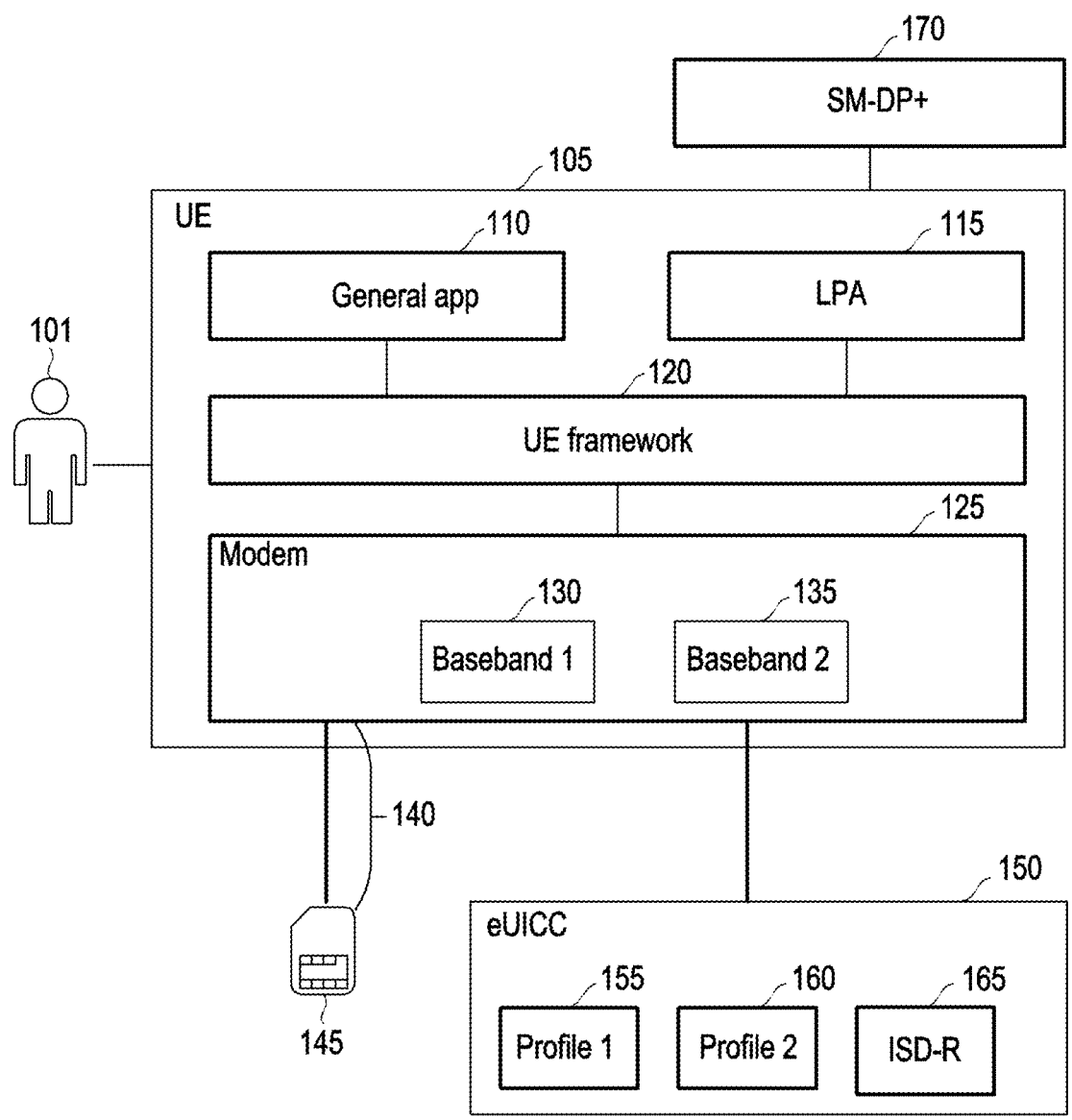
FIG. 1 illustrates components of a wireless communication system according to an embodiment of the present disclosure.

FIGS. 1 through 16, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

Hereinafter, the operation principle of the present disclosure will be described in detail with reference to the accompanying drawings. In the following description of the present disclosure, a detailed description of known functions or configurations incorporated herein will be omitted when it is determined that the description may make the subject matter of the present disclosure unnecessarily unclear. The terms which will be described below are terms defined in consideration of the functions in the present disclosure, and may be different according to users, intentions of the users, or customs. Therefore, the definitions of the terms should be made based on the contents throughout the specification. For the same reason, in the accompanying drawings, some elements may be exaggerated, omitted, or schematically illustrated. Further, the size of each element does not completely reflect the actual size. In the drawings, identical or corresponding elements are provided with identical reference numerals. The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements. Further, in describing the present disclosure, a detailed description of known functions or configurations incorporated herein will be omitted when it is determined that the description may make the subject matter of the present disclosure unnecessarily unclear. The terms which will be described below are terms defined in consideration of the functions in the present disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (B S), a wireless access unit, a base station controller, and a node on a network. A terminal may include a user equipment (UE), a mobile station (MS), a cellular phone, a smartphone, a computer, or a multimedia system capable of performing communication functions. In the present disclosure, a "downlink" refers to a radio link via which a base station transmits a signal to a terminal, and an "uplink" refers to a radio link via which a terminal transmits a signal to a base station. Further, although the following description may be directed to an LTE or LTE-A system by way of example, embodiments of the present disclosure may also be applied to other communication systems having similar technical backgrounds or channel types to the embodiments of the present disclosure. Examples of other communication systems may include 5th generation mobile communication technologies (5G, new radio, NR) developed beyond LTE-A, and in the following description, the "5G" may be a concept that covers exiting LTE, LTE-A, and other similar services. In addition, based on determinations by those skilled in the art, the present disclosure may be applied to other communication systems through some modifications without significantly departing from the scope of the present disclosure. Herein, it will be understood that each block of the flowchart illustrations, and combinations of blocks in the flowchart illustrations, can be implemented by computer program instructions.

These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved. As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

First, terms used in the present disclosure are defined.

In the present disclosure, UICC is a smart card that is inserted into a mobile communication terminal and used, and means a chip that stores personal information such as mobile communication subscriber's network access authentication information, a phone book, and an SMS, and performs subscriber authentication and traffic security key generation when accessing mobile communication systems such as GSM, WCDMA, LTE, 5G, etc., to enable safe mobile communication use. Communication applications such as subscriber identification module (SIM), universal SIM (USIM), and IP multimedia SIM (ISIM) are mounted in the UICC depending on the type of mobile communication network the subscriber accesses. The UICC provides a high-level security function for mounting various application applications such as electronic wallet, ticketing, an e-passport, and the like.

In the present disclosure, an embedded UICC (eUICC) is not limited to a security module embedded in the terminal and includes a removable security module that can be inserted into and removed from the terminal. The eUICC can be installed by downloading a profile using over-the-air (OTA) technology. The eUICC can be named as a UICC that can download and install a profile.

In the present disclosure, a method of downloading and installing a profile by using the OTA technology in the eUICC may be applied to a removable UICC that can be inserted into and removed from the terminal as described above. For example, an embodiment of the present disclosure can be applied to a removable UICC that can be installed by downloading a profile using OTA technology.

In the present disclosure, the term UICC may be used interchangeably with SIM, and the term eUICC may be used interchangeably with eSIM.

In the present disclosure, a profile may mean a package that an application, a file system, an authentication key value, etc., stored in the UICC are packaged in the form of software. In addition, the profile can be named as access information.

In the present disclosure, a USIM profile may have the same meaning as a profile or may mean a package that information included in a USIM application within the profile is packaged in the form of software.

In the present disclosure, a profile server is a server that generates a profile, encrypts the generated profile, generates a profile remote management instruction, and provides a function to encrypt the generated profile remote management instruction, or includes a function to support multiple profile activation of a terminal. The profile server may be expressed as subscription manager data preparation (SM-DP), subscription manager data preparation plus (SM-DP+), or subscription manager secure routing (SM-SR).

The term "terminal" or "device" used in this disclosure may be referred to as a mobile station (MS), user equipment (UE), user terminal (UT), wireless terminal, access terminal (AT), terminal, subscriber unit, subscriber unit (SU), subscriber station (SS), wireless device, wireless communication device, wireless transmit/receive unit (WTRU), mobile node, mobile or other terms. Various embodiments of the terminal include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a wireless communication function, Internet appliances enabling wireless Internet access and browsing, and portable units or terminals incorporating combinations of such functions. In addition, the terminal may include a machine to machine (M2M) terminal and a machine type communication (MTC) terminal/device, but is not limited thereto. In the present disclosure, the terminal may be referred to as an electronic device or simply a device.

In the present disclosure, the terminal or device may include software or an application installed in the terminal or device to control the UICC or eUICC. The software or application may be referred to as, for example, a local profile assistant (LPA). In the present disclosure, the eUICC identifier (eUICC ID) may be a unique identifier of the eUICC embedded in the terminal, and may be referred to as an EID.

In the present disclosure, an application protocol data unit (APDU) may be a message for a controller in a terminal or device to interwork with the eUICC.

In the present disclosure, a profile package may be used interchangeably with a profile or may be used as a term indicating a data object of a specific profile, and may be named as a profile TLV or a profile package TLV. The profile identifier may be referred to as an ICCID as a unique identification number of the profile. When the profile package is encrypted using an encryption parameter, the profile package may be named as a protected profile package (PPP) or a protected profile package TLV (PPP TLV). When the profile package is encrypted using an encryption parameter that can only be decrypted by a specific eUICC, the profile package may be named as a bound profile package (BPP) or a bound profile package TLV (BPP TLV). The profile package TLV may be a data set expressing information constituting a profile in a TLV (tag, length, value) format.

In the present disclosure, AKA may indicate authentication and key agreement, and may indicate an authentication algorithm for accessing 3GPP and 3GPP2 networks. K is an encryption key value stored in the eUICC used for the AKA authentication algorithm, and in the present disclosure, OPc is a parameter value that can be stored in the eUICC used for the AKA authentication algorithm.

In the present disclosure, NAA is a network access application program, and may be an application program such as USIM or ISIM stored in UICC to access a network. The NAA may be a network access module.

In the present disclosure, end-user, user, subscriber, service subscriber, and user may be used interchangeably as a user of a corresponding terminal.

In the present disclosure, the eSIM port refers to a virtual interface used by multiplexing and dividing a physical interface connected to an eUICC-modem, and may be used interchangeably with an eSIM port, a port, a SIM port, a virtual interface, a logical interface, and a logical SE interface (LSI).

The eSIM port used by ISD-R can be expressed as an ISD-R eSIM port, and the eSIM port used by a profile can be classified and used as a profile eSIM Port.

In the present disclosure, information about a profile that can be returned to the LPA through GetProfileInfo( ) may be used as a term such as profile metadata or profile information. The information about the profile may be profile information provided by SM-DP+ when installing the profile to the terminal, status or configuration information of the profile processed by the eUICC receiving an ES10c command from the LPA, or status/configuration information of the profile processed when the eUICC satisfies a specific condition.

In the present disclosure, a function for activating and managing a plurality of profiles existing in a single eUICC is collectively referred to as a multiple enabled profile (MEP) function. In the conventional eUICC, only one profile can be activated, so that a single eUICC cannot support a dual SIM or multi-SIM functions. In order to support the dual SIM or multi-SIM functions with a single eUICC, it is necessary to enable and manage a plurality of profiles in a single eUICC. An eUICC in which the MEP function is implemented may be referred to as an MEP-support eUICC. A terminal including a modem in which the MEP function is implemented and terminal software capable of supporting the modem may be referred to as an MEP-support terminal.

In the present disclosure, a mode determined to be operated in a manner that division, multiplexing, and transmission are performed so that one or more logical interfaces can be used in a single physical interface through an initialization process between the terminal and the eUICC may be referred to as an MEP mode. It should be noted that even an MEP-support terminal or an MEP-support eUICC does not operate in the MEP mode if the operation in the MEP mode is not determined in the initialization process between the terminal and the eUICC.

In the present disclosure, the enabled state of the profile may refer to a state in which all files and/or applications (e.g., network access applications) in the profile are selectable as defined in GSMA SGP.21. In addition, the disabled state of the profile may refer to a state in which all files and/or applications (e.g., network access applications) in the profile are not selectable as defined in GSMA SGP.21.

In the present disclosure, when it is determined that a detailed description of a related known function or configuration may unnecessarily obscure the subject matter of the present disclosure, the detailed description thereof will be omitted.

Hereinafter, embodiment(s) provided by the present disclosure will be described with reference to the drawings.

First, a universal integrated circuit card (UICC) is a smart card inserted and used in a terminal, for example, a mobile communication terminal, and is also referred to as a UICC card. An access control module for accessing a network of a mobile communication service provider may be included in the UICC. Examples of such an access control module include a universal subscriber identity module (USIM), a subscriber identity module (SIM), an Internet protocol multimedia service identification module (ISIM), and the like.

A UICC including a USIM is usually called a USIM card. Similarly, a UICC including a SIM module is commonly referred to as a SIM card. It should be noted that in the following description, a SIM card may be used in a conventional sense including a UICC card, a USIM card, a UICC including an ISIM, and the like. That is, obviously, the technical application of the SIM card may be equally applied to a USIM card, an ISIM card, or a general UICC card.

The SIM card stores personal information of a mobile communication subscriber, and performs subscriber authentication and traffic security key generation when accessing a mobile communication network, thereby enabling safe mobile communication use.

The SIM card is generally manufactured as a dedicated card for a corresponding mobile communication operator at the request of a specific mobile communication operator when the SIM card is manufactured, and authentication information for network access of the corresponding operator, for example, a USIM application and IMSI, K value, OPc value, etc., are loaded on the card in advance and shipped. Accordingly, the manufactured SIM card is supplied to the subscriber by the corresponding mobile communication service provider, and if necessary, management such as installation, modification, deletion, etc., of the application in the UICC can be performed by using technology such as OTA.

By inserting the UICC card into the mobile communication terminal owned by the subscriber, the network and application services of the corresponding mobile communication operator can be used. When replacing the mobile communication terminal, the UICC card is moved from the existing mobile communication terminal and inserted into a new mobile communication terminal, so that authentication information, mobile communication phone number, personal phone book, etc., stored in the UICC can be used as the UICC card is in the new mobile communication terminal.

However, the SIM card is inconvenient for the user of the mobile communication terminal to receive services from other mobile carriers. The user of the mobile communication terminal is inconvenient to physically obtain a SIM card in order to receive services from a mobile communication operator. For example, when traveling to another country, it is inconvenient for the user to obtain a local SIM card in order to receive local mobile communication services. In the case of roaming service, the above inconvenience is solved to some extent, but there is a problem in that the services cannot be received if there is an expensive fee and a contract between the corresponding mobile carriers is not made.

Meanwhile, when the SIM module is remotely downloaded and installed on the UICC card, the above-described inconvenience can be largely solved. That is, the SIM module of the mobile communication service that the user wants to use at a desired time can be downloaded to the UICC card. Such a UICC card may download and install a plurality of SIM modules and may select and use only one SIM module among the plurality of SIM modules. Such a UICC card may or may not be fixed to the terminal. In particular, a UICC that is fixed to a terminal and used is called an eUICC. In general, the eUICC refers to a UICC card that is fixed to a terminal and used, and can remotely download and select the SIM module. In the present disclosure, a UICC that can remotely download and select a SIM module is collectively referred to as an eUICC. That is, among the UICC cards that can remotely download and select the SIM module, a UICC card that is fixed to a terminal and a UICC card that is not fixed are collectively used as eUICC. In addition, the downloaded SIM module information is collectively used as the term "profile."

Even if there is more than one profile in the eUICC, only one profile can be enabled at the same time. Accordingly, even if the terminal supports two or more baseband(s) and two or more profiles exist in the corresponding eUICC, the terminal cannot support a dual SIM function that enables two profiles to be used simultaneously in one mobile phone. As a method to solve this problem, it is possible to mount two eUICC(s) in the terminal, but this requires the installation of an additional eUICC module and a physical interface for connecting the eUICC module to the baseband of the modem, so that the terminal manufacturer may bear the cost of purchasing an additional eUICC module and a physical pin for the physical interface. In addition, securing the mounting space of the terminal due to the module and the physical pin is also a problem.

Since both the current terminal and the eUICC process the initialization therebetween on the assumption that only one profile can be simultaneously enabled in the eUICC, in the initialization process between the UE and the eUICC, a method for determining to support MEP and an operation to be processed by the terminal or the eUICC according to the determination are not defined. In particular, when a removable eUICC supporting MEP is inserted into a terminal, an operation to be processed by the eUICC is not defined. Therefore, the present disclosure intends to solve this problem. In addition, when the user in an eSIM terminal wants to use a PPR1 profile enabled in the eUICC by swapping a connection from a baseband occupied by the PPR1 profile to another baseband, there is no consideration of the method of swapping the connection of the corresponding profile so that this problem needs to be solved.

In the existing wireless communication system, it is assumed that both the terminal and the eUICC can simultaneously enable only one profile in the eUICC, and a method of handling initialization between the terminal and the eUICC is considered. Accordingly, in the initialization process between the terminal and the eUICC, a method for determining to support MEP and an operation to be processed by the terminal or the eUICC according to the determination are not defined. Accordingly, various embodiments of the present disclosure provides a profile handling method when initializing between a UE and an eUICC in a wireless communication system depending on whether to operate in the MEP mode.

In addition, various embodiments of the present disclosure provide, in a wireless communication system that supports MEP, a method in which the eUICC configures a default profile in consideration of a PPR1 profile between a terminal and an eUICC and the terminal or the eUICC efficiently manages the profile using the configured default profile information.

Hereinafter, embodiment(s) provided by the present disclosure will be described with reference to the drawings.

FIG. 1 illustrates components of a wireless communication system according to an embodiment of the present disclosure.

A UE 105 may include a general app 110, an LPA 115, a UE framework 120, and an MEP-support modem 125. Here, the general app 110 is an app that is pre-loaded in a UE or can be downloaded and installed, such as a carrier app or a SIM card manager app and has access to the profile of a physical SIM (pSIM) 145 or an eUICC 150. On the other hand, the LPA 115 is an app in charge of controlling the eUICC and processes the profile management while communicating with a SM-DP+ 170, a UE user 101, and an ISD-R 165 in the eUICC 150. The LPA 115 may be implemented alone or integrated into other general UE applications. The LPA 115 may configure a UI to obtain a user's input for local management of the profile, or may configure a UI for a corresponding command to obtain an input of the user 101 after receiving a remote management command of the SM-DP+ 170 from the SM-DP+ 170, and may then transmit a management command of the profile to an ISD-R 165 of the eUICC 150 to process activation/deactivation/deletion/update of the profile. Remote profile management (RPM) refers to a series of procedures in which profile installation/activation/deactivation/deletion and other functions are performed by instructions transmitted from the SM-DP+ 170 to the UE. The RPM may be requested by a communication operator, a service provider, or the owner of the UE so that instructions may be generated by the SM-DP+ 170.

The communication modem 125 of a UE 105 is a device that modulates and transmits a signal to transmit information and demodulates the transmitted signal at a receiving side to restore the original signal. (In the case of an MEP-support modem, two or more baseband processors (hereinafter, baseband) for wireless communication may be mounted in the communication modem 125. The baseband can be logically implemented within the modem. The modem 125 is connected to a UICC or eUICC by one physical pin (smart card interface conforming to ISO7816 standard), and when the modem transmits an application protocol data unit (APDU) for a command to the eUICC 150 through a corresponding interface, the eUICC 150 operates to respond to the result value with respect to the APDU. A SIM Card (pSIM) occupies one baseband of the modem through one physical pin, and one pSIM has one SIM port. The SIM port may be used interchangeably with a SIM card slot, and is defined as "physical and electronic housing provided on a device to accommodate a physical SIM card" in GSMA technical specification (TS).

The MEP-support eUICC 150 is connected to the MEP-support modem 125 by one physical pin, and the profile in the eUICC occupies one baseband in the MEP-support modem 125. Each profile communicates with the baseband mapped to an eSIM port through the eSIM port. For example, in FIG. 1, profile 1 155 occupies baseband 1 130 using eSIM port 1 in an enabled state, and profile 2 160 occupies baseband 2 135 using eSIM port 2 in an enabled state. In this case, in FIG. 1, the pSIM 145 is inserted, but there is no baseband connection. On the other hand, the ISD-R 165 is an entity in the eUICC 150 that can be selected only in the LPA 115 or the modem 125, and may store metadata of the profiles (155, 160) or the status and configuration information of the profiles (155, 160) in the eUICC 150 or collects the same through an eUICC internal operation and may return the collected status and configuration information when a command is received from the LPA 115 or the UE 105. For example, as an ISD-R selection command APDU or a message of the APDU, a command such as GetProfileInfo( ) may be received. Meanwhile, the LPA 115 is software operating on the UE framework 120, and functions of the LPA 115 may be partially integrated into the UE framework 120. The message transmitted from the LPA 115 to the eUICC 150 is finally transmitted (120) to the eUICC 150 via the UE framework 120 and the modem 125, and the eUICC 150 receiving the message identifies an ES10c command in the APDU transmitted from the LPA 115 and performs a profile management operation of the eUICC 150.

In FIG. 1, it is assumed that two profiles, profile 1 155 and profile 2 160, exist in the eUICC 150 for convenience of explanation below, but is not limited thereto. It may be noted that more profiles may exist depending on the memory capability of the eUICC 150, and two or more profiles may exist in an enabled state. In the MEP-support eUICC, profile 1 155 and profile 2 160 may be enabled at the same time, and in the non-MEP-support eUICC, only one profile among profile 1 155 or profile 2 160 can be enabled. The ISD-R 165 generates a new ISD-P (meaning a security domain for hosting the profile) and as described above, the necessary eUICC data and services (e.g., local profile management, profile information, etc.) required by the LPA functions are stored or collected in the eUICC 150 and provided to LPA 115.

Meanwhile, although not shown in FIG. 1, for convenience of description, the eUICC 150 of the UE 105 may include an embedded UICC controlling authority security domain (ECASD), which is a space for storing certificates required by the security domains of the eUICC 150, for example, a certificate issuer's root public key for verifying a SM-DP+ certificate, keyset of eUICC manufacturer, etc., an eSIM operating platform, etc.

The UE framework 120 refers to the operating system of the UE 105 and exists between the modem 125/other UE systems and the general app 110/the LPA 115. The UE framework 120 may obtain information about the eUICC 150 from the modem 125 and have the obtained information, and may return the corresponding information when the general app 110 or the LPA 115 requests information about the UE 105 or the eUICC 150. In addition, the UE framework 120 generates a command APDU according to a channel open or port open command received from the general app 110 or the LPA 115 and transmits the generated command APDU to the modem 125, receives a response message for the corresponding APDU from the modem 125, and transmits the received response message back to the general app 110 or the LPA 115. In addition, the UE framework 120 may receive channel.transmit (Command APDU) called from the general app 110 or the LPA 115 and may transmit the corresponding response in the channel.transmit (Response APDU) format to the general app 110 or the LPA 115.

The SM-DP+ server 170 refers to a server including functions of generating a profile, encrypting the generated profile, generating a profile remote management command, or encrypting the generated profile remote management command, as described above, or a function of supporting activation of a plurality of profiles of the UE 105.

Figure 2:
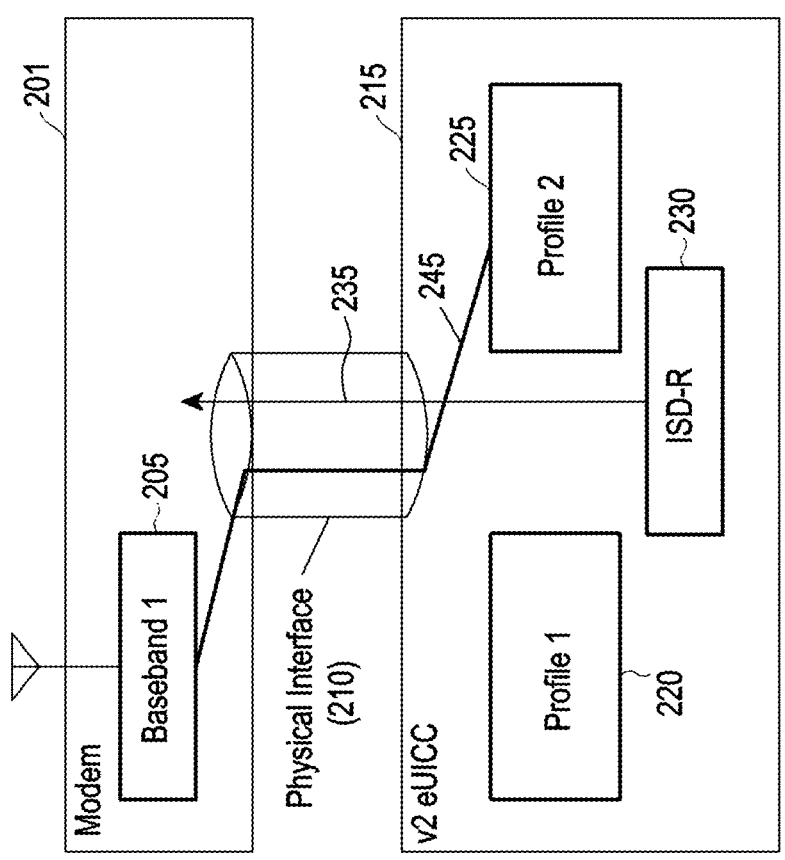
FIG. 2 schematically illustrates an example of a connection between a current v2 embedded universal integrated circuit card (eUICC) that does not support MEP and a modem in a wireless communication system according to an embodiment of the present disclosure.
Figure 2:
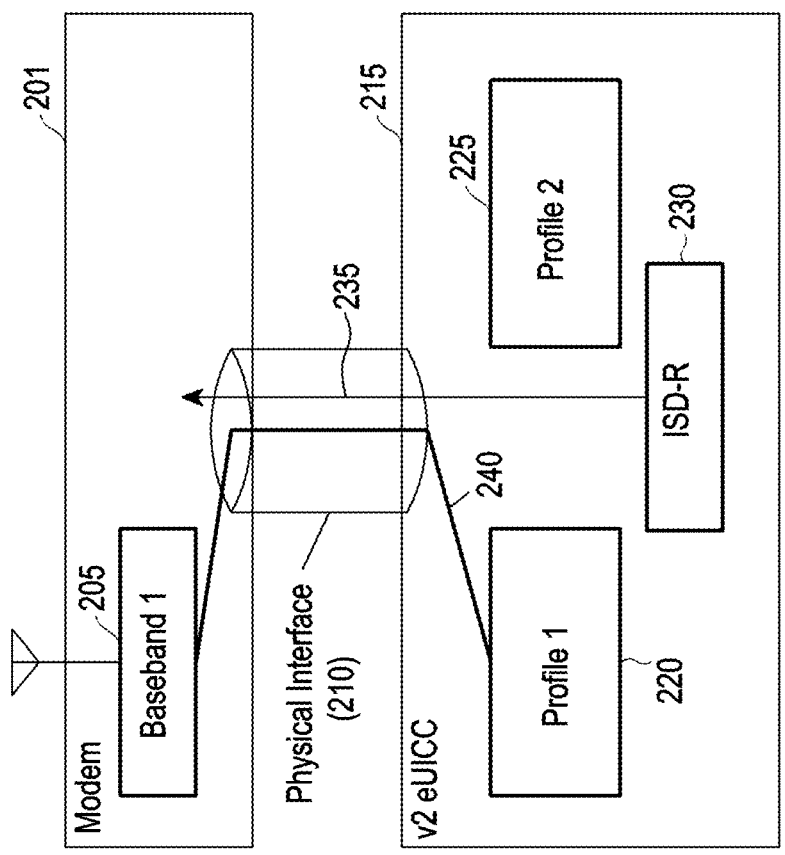

FIG. 2 schematically illustrates an example of a connection between a current v2 embedded universal integrated circuit card (eUICC) that does not support MEP and a modem in a wireless communication system according to an embodiment of the present disclosure.

In the existing v2 eUICC 215, only a single (one) profile can be enabled in the eUICC 215, and only user's local profile management is possible without intervention of SM-DP+ in order to process activation/deactivation/deletion/update of pre-installed profiles. In the case of a modem 201 not supporting MEP, the modem 201 may have one or more basebands in consideration of a case in which the pSIM card is used simultaneously with the eUICC 215, but in this disclosure, one baseband is assumed so as not to obscure the point of the present disclosure. In an initialization process between the UE and the eUICC 215, the modem 201 may identify the maximum number of openable channels through answer to reset (ATR) information received by the eUICC 215, and may generate a maximum of 20 (#0 to #19) existing channels. During an initialization process between the modem 201 and the eUICC 215, the modem 201 may select ISD-R 230 in the eUICC 215 and may generate a channel for transmitting the APDU through a MANAGE CHANNEL open command. Next, when receiving a request for channel open from the UE framework at a specific point in time, the modem 201 additionally opens each independent channel for processing the profile between the application and the eUICC 215 or APDU transmission between the LPA and ISD-R 230 to transmit the APDU. In the prior art, since only one physical interface 210 is used between the modem 201 and the eUICC 215, the modem 201 allocates an independent channel to transmit the APDU in order to be able to process the APDU transmission to the end between specific Applets in the profile between the application and the eUICC 215 or between the LPA and the ISD-R 230 in the physical interface 210.

In the eUICC up to v2 eUICC 215, only one profile can be enabled at the same time. One enabled profile such as case 1 (2100) or case 2 (2200) occupies one baseband 205 of the modem 201, and when it is necessary to transmit a REFRESH proactive command to the modem 201 in the enabled profile of the eUICC 215, the modem 201 may transmit the APDU through a channel pre-allocated to the App ID of the enabled profile. For example, in case 1 (2100), a USIM application of profile 1 220 may transmit the APDU through an arbitrary channel #0 240 allocated by the modem between the baseband 1 205 and the profile 1 220.

On the other hand, when an ISD-R 230 receives, from the LPA, ES10c.EnableProfile (profile 2) request for the state change of the profile, for example, the state change from case 1 (2100) to case 2 (2200) or when a eUICC memory reset is requested, the ISD-R 230 may transmit, to the modem 201, the proactive command including eUICC reset and/or the profile state change (eUICC profile state change) through the REFRESH proactive command in order to process data deletion of the profile previously cached and/or to restart an application session. In this case, the ISD-R 230 transmits, to the modem 201, a response APDU indicating that there is the proactive command as a return value for the APDU transmitted by the modem 201 to the ISD-R 230, and the modem 201 may receive the response APDU and may issue a FETCH APDU command to a basic channel to return the proactive command for the UICC reset or eUICC profile state change as the body of the response APDU of the corresponding message. When the state change from case 1 (2100) to case 2 (2200) is completed, in case 2 (2200), the USIM application of profile 2 225 may transmit the APDU through an arbitrary channel 245 between the baseband 1 205 and the profile 2 225 allocated by the modem 201.

Figure 3:
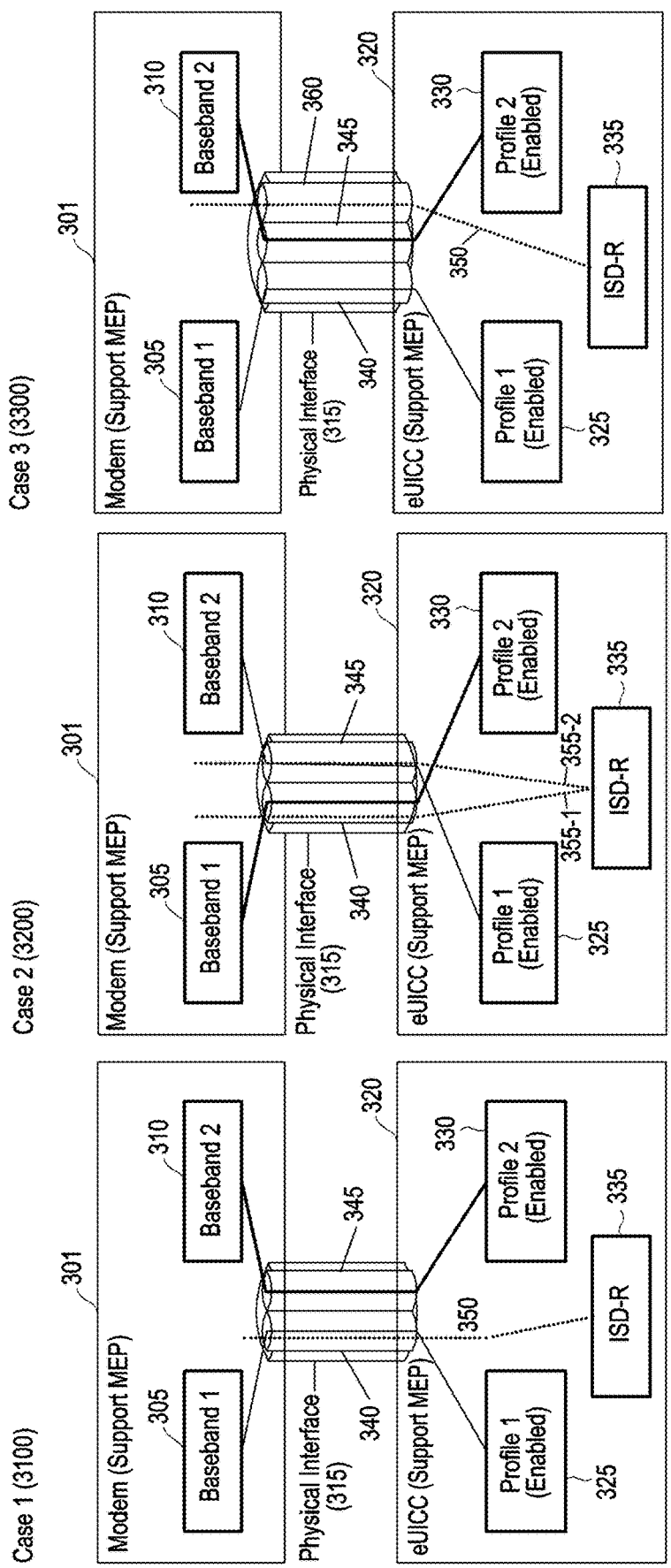
FIG. 3 schematically illustrates an example of a connection between an eUICC and a modem according to the introduction of the concept of a virtual interface (which may be interchangeably used with a logical interface) in a wireless communication system according to an embodiment of the present disclosure.

FIG. 3 schematically illustrates an example of a connection between an eUICC and a modem according to the introduction of the concept of a virtual interface in a wireless communication system according to an embodiment of the present disclosure.

For convenience of description, in FIG. 3, it is assumed that an eUICC 320 supports an MEP function capable of simultaneously enabling a plurality of profiles. Meanwhile, it is assumed that a modem 301 also supports the MEP function. In FIG. 3, a situation in which there are two basebands (baseband 1 305 and baseband 2 310) and two enabled profiles (profile 1 325 and profile 2 330) will be described as an example. Mapping between the baseband and the eSIM port in the modem 301 may be switchable, but in case 1 (3100) to case 3 (3300) of FIG. 3, in order not to obscure the point of the present disclosure, mapping of a logical terminal endpoint in the modem 301 may be limitedly described between baseband 1 305 and channel 1 340 and between baseband 2 310 and channel 2 345.

The eUICC 320 supporting MEP may enable a plurality of profiles, and each enabled profile may occupy and use a specific baseband of the modem 301. In MEP, since two or more profiles can be simultaneously enabled, a logical interface concept for multiplexing the existing physical interface 315 and dividing the multiplexed interface for each enabled profile to transmit an APDU can be introduced. Hereinafter, for convenience of description, a corresponding logical interface is referred to as an eSIM port, and is divided into eSIM port #1 340, eSIM port #2 345, and eSIM port #0 360.

As a result of the initialization between a UE and an eUICC 320, a port and a transmission channel in the port for APDU transmission between the modem 301 and the eUICC 320 may be generated. In this case, an eSIM port ID mapped to each baseband may be configured. The corresponding port ID may be configured in the modem 301 or a UE platform and transmitted to the LPA. The port ID is used interchangeably as a port number for convenience of description in the present disclosure. The modem 301 may have the same number of eSIM ports as the number of basebands, but the number of eSIM ports utilized by the eUICC 320 may be equal to or smaller than the number of profiles that can be simultaneously enabled in the eUICC 320. The profile may use one of the corresponding eSIM ports to receive an APDU message and may transmit the proactive command to the modem 301.

In the examples of Cases 1 to 3 of FIG. 3, the modem 301 may transmit the APDU command to the enabled profile 1 325 through the eSIM port #1 340. The profile 1 325 may transmit the proactive command to the baseband 1 305 through the eSIM port #1 340. The modem 301 may transmit the APDU command to the enabled profile 2 330 through the eSIM port #2 345. The profile 2 330 may transmit the proactive command to the baseband 2 310 through the eSIM port #2 345.

Meanwhile, as in case 1 (3100), case 2 (3200), or case 3 (3300), which will be described below, a UE modem 301 may configure a channel for transmitting the APDU to the ISD-R 335 as one of the following methods.

Case 1 (3100): opens a transport channel so that the ISD-R 335 can be selected only through one of the eSIM ports. The eSIM port used by the ISD-R 335 shares a port with a profile, but uses a single independent channel within the port. In this case, for example, the LPA transmits and receives, to/from the ISD-R 335, the APDU only through a channel 350 allocated to the ISD-R 335 in the port #1 340.

Case 2 (3200): opens a transmission channel for each port so that the ISD-R 335 is selected through all the eSIM ports occupied by the profile. The eSIM port used by the ISD-R 335 shares a port with the profile occupying the port, but uses a single independent channel within the port. In this case, for example, the LPA selects one of a channel 355-1 assigned to the ISD-R 335 in port #1 340 or a channel 355-2 assigned to the ISD-R 335 in port #2 345, and transmits and receive, to/from the ISD-R 335, the APDU simultaneously or asynchronously.

Case 3 (3300): opens a dedicated port and a transmission channel in the dedicated port so that the ISD-R 335 is selected through the dedicated port for the ISD-R 335. The dedicated port exists independently of the eSIM port used by the profile and uses a single channel within the dedicated port. In this case, for example, the LPA transmits and receives, to/from the ISD-R 335, the APDU using the allocated channel 350 in the independent dedicated port 360 for the ISD-R 335.

Figure 4:
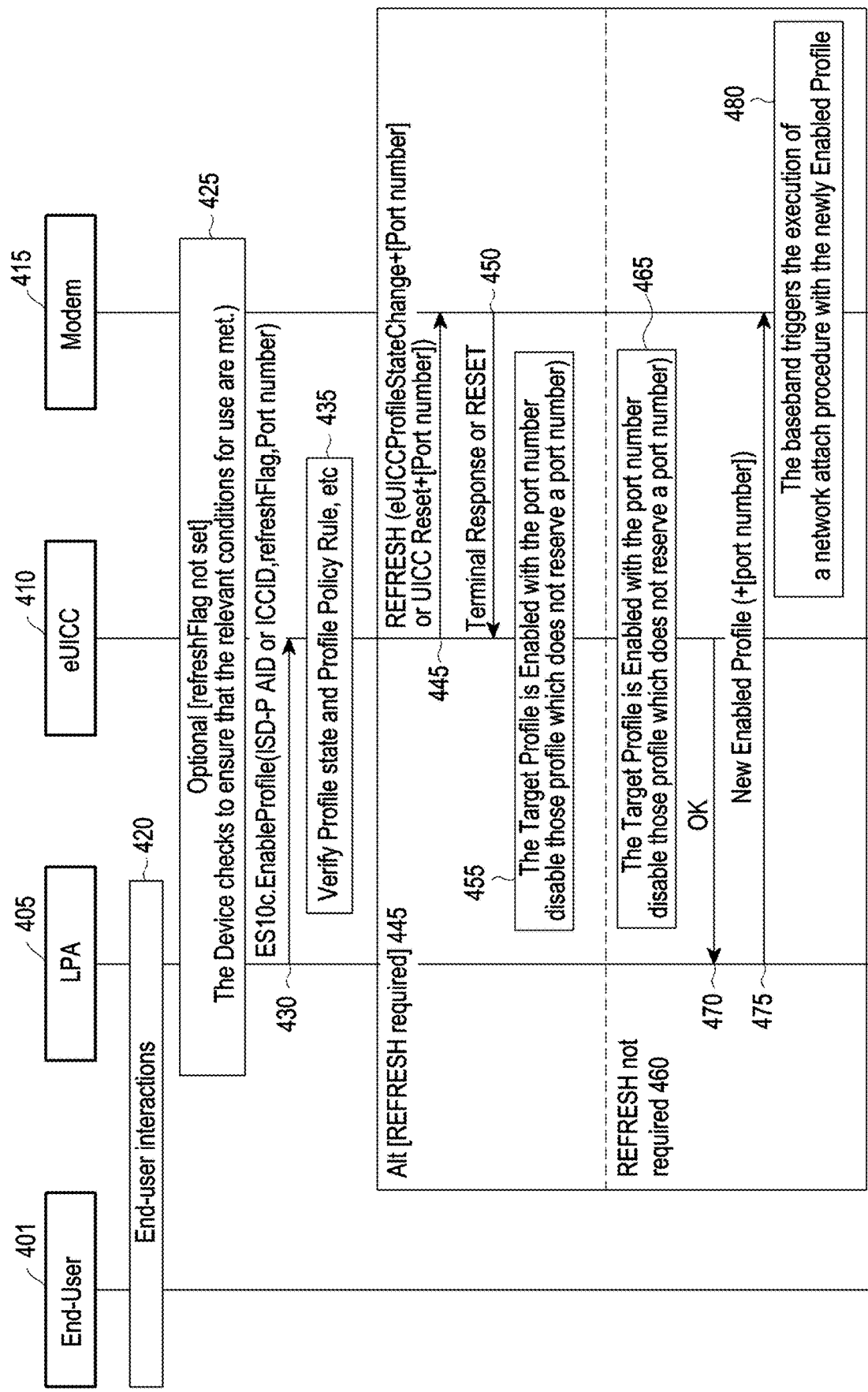
FIG. 4 illustrates a method for a UE and an eUICC to process local profile activation when the UE operates in an MEP mode according to an embodiment of the present disclosure.

FIG. 4 illustrates a method for a UE and an eUICC to process local profile activation when the UE operates in an MEP mode according to an embodiment of the present disclosure.

As described above, v2 eUICC that does not support the MEP function is designed so that only one profile can be enabled. When there is a previously enabled profile, in order to enable another profile, the previously enabled profile may be changed to a disabled state in the v2 eUICC. However, in the case of eUICC that supports the MEP function, when processing a profile activation command, other currently enabled profiles may not be disabled depending on the location of the eSIM port on which the profile is to be enabled. For example, when the eSIM has eSIM port 1 and eSIM port 2 and profile 2 is currently enabled on the eSIM port 2, and additionally, when profile 1 is expected to be enabled on the eSIM port 1, profile 2, which is currently enabled on the eSIM port 2, is processed not to be disabled. In addition, when a UE has a baseband supporting different RATs, since radio access technology (RAT) that can be provided through the corresponding profile varies depending on the baseband with which the eSIM port is matched, it is necessary to provide information so that the user or the server (at the time of RPM) can determine with which eSIM port the profile to be enabled is matched. For example, in a case in which the eSIM port 1 is matched with a baseband supporting a 4G network and the eSIM port 2 is matched with a baseband supporting a 5G network, when the information above is known to the user or the server performing remote management, it can be helpful in selecting an appropriate eSIM port to enable a particular profile.

The number of profiles simultaneously enabled in the eUICC at a specific time point may be limited to be equal to or smaller than the number of eSIM ports allocated by the eUICC. When the activation of the profile is desired to be processed through the user or SM-DP+, the eUICC may return the maximum number of profiles that can be enabled to the eUICC, to the LPA or SM-DP+ server, in consideration of the number of currently activated profiles and the number of eSIM ports.

The LPA or UE software may utilize information (e.g., the number of eSIM ports allocated by the eUICC) transmitted from the eUICC as predetermined information for notifying the user that the currently enabled profile needs to be disabled. FIG. 4 illustrates a procedure for enabling a profile as an example of a method for an end-user 401 to manage a profile through an LPA 405 in an MEP-support UE. A case in which all of an eUICC 410, a modem 415, and the LPA 405 in FIG. 4 support MEP will be described as an example.

In operation 420, the end-user 401 executes an activation command for a profile installed in the UE through information displayed on the LPA 405 or an application in which the LPA 405 is integrated and implemented. The LPA 405 of the UE or the LPA implemented application may display a list of profiles installed in the eUICC 410 and current status information of the profile to the end-user 401. In addition, it is possible to additionally display wireless access technology that can be provided for each baseband of a UE modem from the UE, information on the eSIM port matched with the corresponding baseband for APDU transmission, and occupancy status information of the profile of the corresponding port from the eUICC. In this case, the LPA 405 may identify profile policy rules of the profile and additionally display a warning message such as profile activation impossible to the end-user 401. When the end-user 401 selects a specific profile (named profile 3) through the information displayed on the screen and determines to enable the selected profile, the LPA 405 transmits ES10c.EnableProfile (ISD-P AID (Issuer security domain-profile application ID) or ICCID (Profile ID), refreshFlag, port number) Command for enabling the profile to the eUICC 410 while including the port number matched to the selected baseband in operation 430. When REFRESH proactive command is required, refreshFlag is additionally configured and transmitted. It is also possible for the LPA 405 to transmit the above-described ES10c.EnableProfile Command without configuring refreshFlag. However, in this case, before the LPA 405 transmits the ES10c.EnableProfile Command, when there is an enabled profile in the port, the UE may process application session end on the port occupied between the eUICC 410 and the modem 415, close of a logical channel that was opened to select the application, and, if exists, close of a proactive command session between the modem 415 and the eUICC 410 in operation 425.

When receiving the activation profile command from the LPA 405, the eUICC 410 may perform a deactivation procedure for the profile (referred to as profile 1 for explanation) occupying the corresponding port, and may enable the profile (referred to as profile 3 for explanation) having the ICCID (profile ID) transmitted by being included in ES10c.EnableProfile to the corresponding port in operation 430. The ISD-R of the eUICC 410 may determine whether the profile 3 can be enabled comprehensively by identifying the enabled states of the profile 3 to be enabled and the existing profiles installed in the eUICC 410 and profile policy rules (PPR) in operation 435, and when the activation is impossible, the ISD-R of the eUICC 410 may return an error message to the end-user 401. In determining whether the profile 3 can be enabled in the eUICC 410 supporting MEP, when a port occupied by the existing profile (referred to as profile 1) is desired to be used in the eUICC 410 for activation of the profile 3, it can be determined that the eUICC changes the state of the profile, only for the profile 1 that used the port, to be disabled and changes the profile 3 to be enabled. When the profile 3 occupies an empty port, the MEP-support eUICC 410 may proceed without performing a deactivation procedure for other profiles in the eUICC.

In operation 440, when the refreshFlag is configured in ES10c.EnableProfile Command, the eUICC 410 may transmit a REFRESH proactive command to the modem 415 to request profile state change processing or UICC reset processing in operation 445. The modem 415 may transmit a terminal response (when the eUICC 410 transmits an eUICC profile state change) to the eUICC 410 or may not transmit the terminal response (when the eUICC 410 transmits a UICC reset) according to the result of processing the REFRESH in the modem 415 in operation 450. After receiving the terminal response by transmitting the eUICC profile state change or after transmitting UICC reset, the eUICC 410 may match the profile 3 with the port number transmitted in operation 430, and may disable the profile (e.g., profile 1) and enable the profile 3 when the profile is enabled in the port corresponding to the port number, or may enable only the profile 3 when the port is unoccupied in operation 455.

In operation 460, when the refreshFlag is not configured in ES10c.EnableProfile Command, the eUICC 410 may match the profile 3 selected after operation 435 with the port number transmitted in operation 430, and may disable the profile (e.g., profile 1) and enable the profile 3 when the profile is enabled in the port corresponding to the port number, or may enable only the profile 3 when the port is unoccupied port in operation 465. When the eUICC 410 returns the result of performing the above procedure to the LPA 405 in operation 470, in the UE, the LPA 405 requests and performs, with the modem 415, a command corresponding to REFRESH such as deletion of a cache value according to the profile state change, and the modem 415 performs the UICC activation procedure including TERMINAL PROFILE defined in ETSI TS in operation 475. After the above procedure is performed, the modem 415 performs a network attach procedure using information of a profile (e.g., profile 3) newly connected to the port in the baseband connected to the port in operation 480.

Meanwhile, although not shown in FIG. 4, when the ISD-R receives port information mapped to the profile from the LPA 405, the ISD-R stores the mapping information of the corresponding profile and port, and when the LPA 405 requests getProfileInfo( ) to the ISD-R or when the LPA 405 request information for remote profile management from SM-DP+, the ISD-R may include the profile and the port information mapped with the profile and provide them together. In addition, as described later in detail in FIG. 6, the eUICC operating in the MEP mode determines whether to configure the default profile of the corresponding profile, updates the default profile configuration information with the profile information, and when receiving getProfileInfo( ) from the LPA, provide the default profile configuration information with the profile information. That is, the ISD-R may provide at least one of the state information of the installed profiles, the mapping information of the installed profiles and the ports, the ICCID of the profile configured as the default profile, or the port number used by the profile configured as the default profile.

Figure 5:
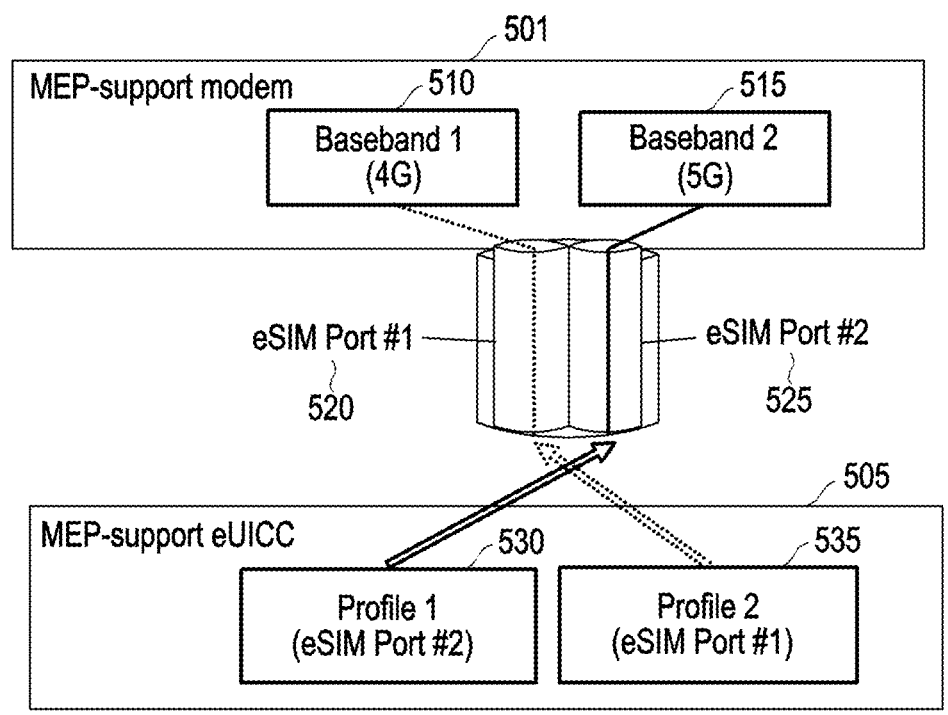
FIG. 5 schematically illustrates a connection between an eUICC and a modem of maintaining an existing configuration when an MEP-support UE is rebooted in a wireless communication system according to an embodiment of the present disclosure.

FIG. 5 schematically illustrates a connection between an eUICC and a modem of maintaining an existing configuration when an MEP-support UE is rebooted in a wireless communication system according to an embodiment of the present disclosure.

In the case of rebooting by performing reset between a UE and eUICC, such as turning off and on the power of the UE or inserting a removable eUICC into the UE, an MEP-support modem 501 and an MEP-support eUICC 505 may process to maintain association among a baseband, an eSIM port, and a profile before rebooting. When the eUICC 505 receives an ES10c.EnableProfile (profile ID or application ID, port number to be enabled) Command for enabling the profile in a specific eSIM port, the eUICC 505 may enable the profile and store mapping information between the profile and the eSIM port as metadata of the profile or as profile information in a memory in the eUICC. As described above, when the eUICC 505 has an eSIM port with the enabled profile in an initialization process with the UE, the number (s) of the eSIM port in which the profile is enabled may be returned to the modem 501 through one of ATR, a response message of terminal capability, ISDRProprietaryApplicationTemplate, or a response message to configuration information request transmitted by the eUICC 505 in the UE through the port. On the other hand, the modem 501 stores mapping information between the baseband and the eSIM port configured before the power is turned off and on again (power cycle), and performs, upon receiving information of the eSIM port number(s) for which the profile is enabled from the eUICC, a mapping process with the same eSIM port number by resetting the connection to the eSIM port number provided by the eUICC.

In FIG. 5, it is assumed that a connection of baseband 1 (4G support) 510 to eSIM port #1 520 and a connection of baseband 2 (5G supported) 515 to eSIM port #2 525 are configured in the MEP-support modem 505, and profile 1 530 is enabled in eSIM port #2 525 and profile 2 535 is enabled in eSIM port #1 520 in the MEP-support eUICC 505. When initialization between the UE and the eUICC is performed by rebooting, the eUICC 505 may return, to the modem 501, #1 and #2 as the number of the eSIM port for which the profiles are enabled and #1 as the port number for which the default profile is enabled in the process of initializing with the UE, through one of ATR, a response message of terminal capability, ISDRProprietaryApplicationTemplate, or a response message to a configuration information request transmitted by the eUICC 505 in the UE through the port. When the modem 501 determines the operation in the MEP by receiving the port number information, the modem 501 may recognize the fact that it is necessary to generate at least two eSIM ports for a profile connection based on the previously stored mapping information between eSIM port and baseband, and may map the eSIM port #1 520 to the baseband 2 (5G) 515 and the eSIM port #2 525 to the baseband 1 (4G) 510.

On the other hand, the eUICC 505 has the mapping information between the eSIM port number and the profile stored as the profile information, and may process a connection for activation of the profile 2 535 on the eSIM port #1 520 and a connection for activation of the profile 1 530 on the eSIM port #2 525. On the other hand, when the eSIM port numbers #1 and #2 cached by the modem 501 before rebooting is different from the eSIM port number(s) received from the eUICC 505, or when the ID (EID) for the eUICC 505 received as one of ATR, the response message of terminal capability, ISDRProprietaryApplicationTemplate, or the response message to the configuration information request transmitted by the eUICC 505 in the UE through the port is different from the previously cached EID, the modem 501 may determine that a new removable eUICC has been inserted, delete the previously cached eSIM port number(s) while generating the new eSIM port(s), allocate a new port number(s), and provide the new port number(s) to the eUICC 505.

Figure 6:
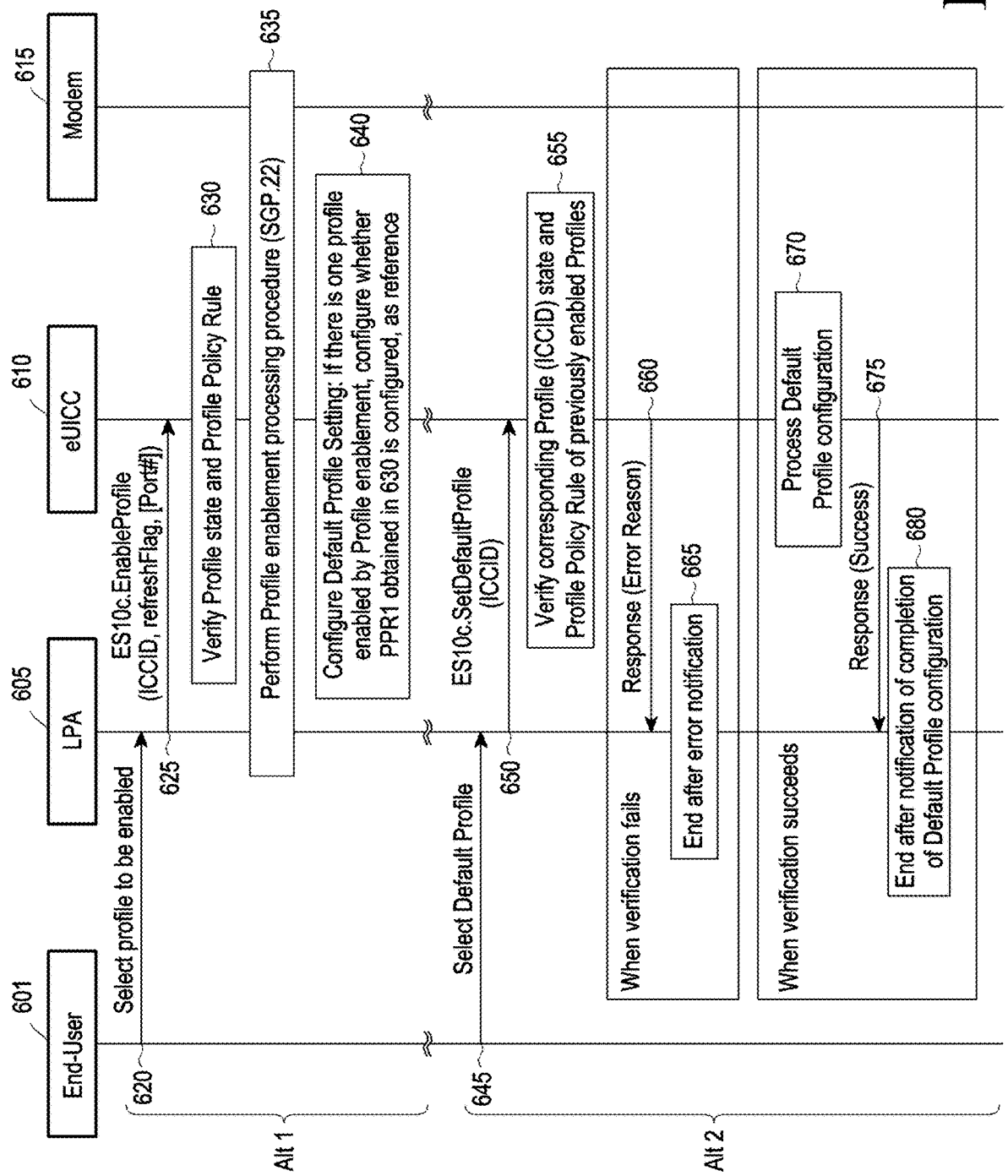
FIG. 6 illustrates a method of configuring a default profile by an MEP-support eUICC inserted or fixed in a UE according to an embodiment of the present disclosure.

FIG. 6 illustrates a method of configuring a default profile by an MEP-support eUICC inserted or fixed in a UE according to an embodiment of the present disclosure.

When an eUICC 610 performs default profile configuration through a profile activation command, the eUICC 610 communicating with an eSIM-support UE may be a removable eUICC or an eUICC fixed to the UE, which supports MEP. In operation 620, an end-user 601 may select a profile to be enabled in an LPA 605. In operation 625, when the end-user 601 selects the profile to be enabled in the LPA 605, the LPA 605 may transmit a profile activation command to the eUICC 610. In this case, the LPA 605 operating in an MEP mode may include and transmit ICCID of the profile to be enabled and, additionally, an eSIM port number as identification information indicating on which eSIM port the profile is to be enabled. For example, the command may include an ES10c.EnableProfile (ICCID of the profile to be enabled, refreshFlag, and Port #) message. In operation 630, the eUICC 610 having received the profile activation command may identify whether the corresponding profile is already enabled and may verify information on a profile policy rule for the corresponding profile. In operation 635, when it is determined that the activation of the corresponding profile is possible through the verification, the eUICC 610 processes the activation of the corresponding profile and selectively transmits information about a profile state change to the modem 615, for example, through a REFRESH proactive command message to cause the modem 615 to perform a necessary operation such as reset, thereby completing the activation of the corresponding profile.

In operation 640, when there is one enabled profile as a result of enabling the corresponding profile, the eUICC 610 may configure the corresponding profile as a default profile and store the default profile. When there is one or more enabled profiles as the result of enabling the corresponding profile and the corresponding profile to be enabled in operation 630 is a profile in which PPR 1 is configured, the eUICC 610 may change and configure the profile in which the enabled PPR1 is configured as a default profile regardless of whether a previous default profile is configured. In a case in which a removable MEP-support eUICC is inserted into a non-MEP-support eSIM UE, when a profile activation command is received from the LPA, the eUICC may configure and store a default profile through the determination process in operation 640 regardless of whether the activation command includes the eSIM port number and is received.

In another embodiment (operations 645 to 680) of configuring the default profile, in operation 645, the LPA 605 may provide a screen for configuring the default profile to an end-user 601, so that the end-user 601 may configure the default profile through a UI.

In this case, the LPA 605, the eUICC 610, and the modem 615 are all modules supporting MEP, and may operate in an MEP mode in the initialization process between the UE and the eUICC. In addition, the eUICC 610 may be a removable eUICC or an eUICC that is fixed to the UE. When there is one enabled profile in the UE or when a profile with PPR 1 already configured is enabled, the LPA 605 may not selectively display the UI for configuring the default profile.

In operation 645, when the end-user 601 selects one of the profiles through the screen for configuring the default profile of the UE and inputs the configuration as the default profile, the LPA 605 of the UE may transmit a command to configure the selected profile as the default profile to the eUICC 610 in operation 650. For example, the command may include a message such as ES10c.SetDefaultProfile (ICCID of the selected profile). When the eUICC 610 receives ES10c.SetDefaultProfile (ICCID of the selected profile) from the LPA 605, the eUICC 610 verifies whether the profile corresponding to the ICCID is enabled, and verifies whether there is a profile with PPR1 among the existing profiles of the eUICC 610 in operation 655. According to the verification result, the eUICC 610 may transmit an error message to the LPA 605 in operation 660 or process the default profile configuration in operation 670, and may successfully return a response to the configuration to the LPA 605 in operation 675.

As the verification results in the eUICC 610, a case in which an error message is transmitted may be a case in which the ICCID of the profile configured in ES10c.SetDefaultProfile (ICCID of the selected profile) is the ICCID of the disabled profile, or a case in which a change in the default configuration is required for a PPR 1 profile through the corresponding request. In this case, the error message returned by the eUICC 610 may be, for example, one of error messages such as profileNotInEnabledState and changeNotAllowedbyPPR1.

On the other hand, when the UE determines to operate in a non-MEP mode during the initialization process between the UE and the eUICC, such as rebooting between the UE and the eUICC, a method of disabling or not displaying a user selection menu for configuring the default profile in the MEP support LPA 605 is also possible. However, there may be a possibility that the user selection menu is exposed and the ES10c.SetDefaultProfile (ICCID of the selected profile) is transmitted to the eUICC 610 according to the end-user's selection. In a case in which the eUICC 610 receives the message, when the eUICC is to operate as a general eUICC in the initialization process between the UE and the eUICC, such as rebooting between the UE and the eUICC, the eUICC 610 may return an error message to the LPA 605 because it is impossible to process the default profile configuration in the same manner as the non-support general eUICC even if the eUICC is an MEP-support eUICC.

The LPA 605 having received an error or success response message may selectively provide a message about the default profile configuration result to the end-user 601 UI to guide the processing result to the end-user 601. That is, when the LPA 605 receives the error message, the LPA 605 may inform the end-user 601 of an error regarding the default profile configuration and may end the procedure in operation 665. In addition, when the LPA 605 receives the success response message, the LPA 605 may inform the end-user 601 that the default profile configuration has been completed and may end the procedure in operation 680.

Meanwhile, the method for the eUICC 610 to configure the default profile in operations 620 to 640 of FIG. 6 may be similarly applied even when the previously configured default profile is disabled. For example, when the end-user 601 selects a profile to be disabled and LPA 605 requests ES10c.DisabledProfile (ICCID, refreshFlag, [Port #]) for profile deactivation to the eUICC 610, the eUICC 610 may verify whether the profile corresponding to the ICCID is in an enabled state and is not the PPR1 profile. If possible, deactivation of the profile corresponding to the ICCID as defined in SGP.22 may be processed. Next, similarly to operation 640, when the eUICC 610 determines that there is one enabled profile in the eUICC 610 as a result of the deactivation of the default profile, the eUICC 610 may change and configure one enabled profile to a default profile. When the eUICC 610 determines that there are two or more remaining enabled profiles in the eUICC 610 due to the deactivation of the default profile, the eUICC 610 may configure a profile configured in a specific port (e.g., low port number) as the default profile based on the stored configuration or request reconfiguration of the default profile through other operations (operations 645 to 680) while returning the profile deactivation processing result to the LPA 605.

Figure 7:
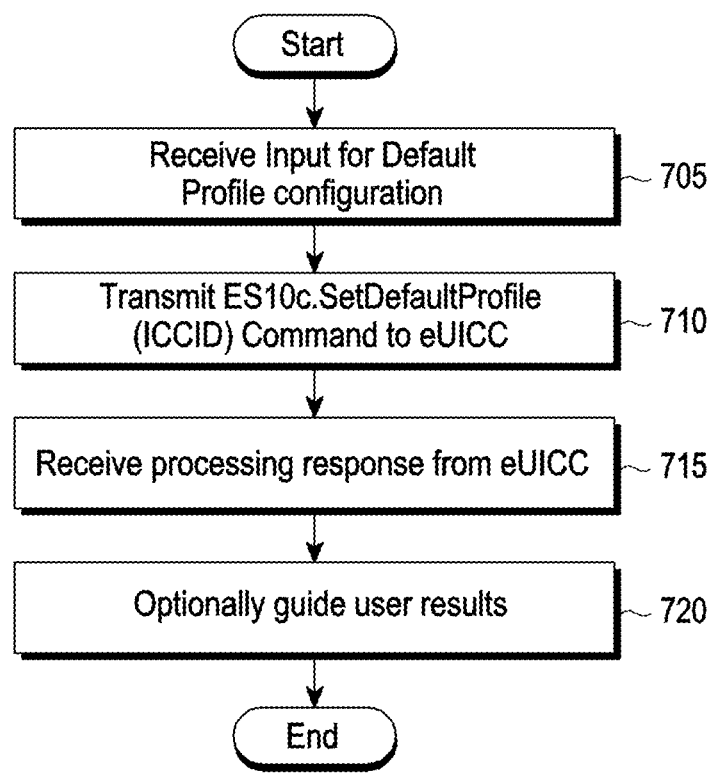
FIG. 7 illustrates a process of configuring a default profile in an LPA of a UE according to an embodiment of the present disclosure.

FIG. 7 illustrates a process of configuring a default profile in an LPA of a UE according to an embodiment of the present disclosure.

Referring to FIG. 6 described above, the LPA may or may not operate in an MEP mode, and an eUICC supporting MEP may or may not operate in the MEP mode. In FIG. 7, a case in which the LPA operates in the MEP mode will be described as an example.

Referring to FIG. 7, in operation 705, the LPA operating in the MEP mode may provide a user with a menu for configuring a default profile, thereby receiving an input of default profile configuration of the user. When the UE does not determine to operate in the MEP mode during the initialization process between the UE and the eUICC, the LPA may operate as an MEP-nonsupport LPA not to display a menu for selecting a default profile on the screen or to disable the menu so that the user cannot select the default profile. In addition, even when the LPA operates in the MEP mode, the LPA may identify the number of profiles enabled in the eUICC with information obtained by transmitting GetProfileInfo( ) or ISD-RProprietaryTemplate commands to the eUICC, and may not expose the menu or disable the selection so that the user cannot select the default profile when there is one enabled profile in the eUICC.

In operation 710, when the user clicks on a profile to be selected as a default profile or selects the profile as the default profile by selecting one of specific ports on which the profile is enabled, the LPA may detect an event for configuring the default profile and may transmit an ES10c.SetDefaultProfile (ICCID) command to the eUICC while including the ICCID of the selected profile or the ICCID of the profile enabled in the selected port.

In operation 715, the LPA may receive a processing response result to the corresponding command from the eUICC. The corresponding received response may be one of error messages such as profileNotInEnabledState and changeNotAllowedbyPPR1, or a message for normal response processing. As described above in FIG. 6, a case in which an MEP-support eUICC that does not operate in the MEP mode is inserted in the UE is possible. In this case, the LPA may receive an error message including the inability to process the corresponding message as a reply.

In operation 720, the LPA having received the corresponding message may selectively inform the user of the processing result according to a returned code value and message. When receiving profileNotInEnabledState, changeNotAllowedbyPPR1, or other error messages, the LPA may display a notification message for the inability to configure the default profile to the user and may end. When a success response message is received, the LPA may display information indicating that the default profile configuration has been completed to the UI, and may end. As an example, the success response message may be a response message such as status code=ok, error reason=setDefaultProfileResult.

Figure 8:
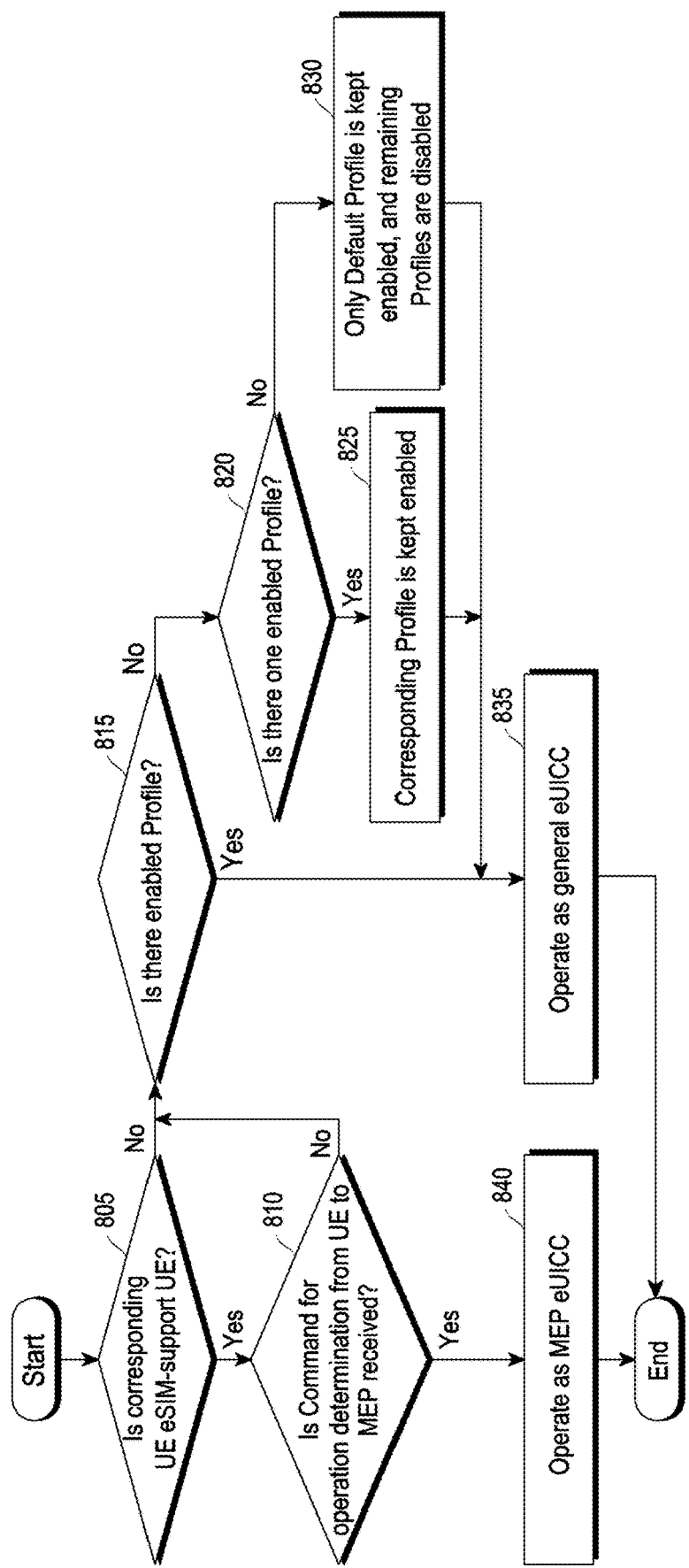
FIG. 8 illustrates a method in which an MEP eUICC determines profile processing using default profile information in an initialization process between a UE and the MEP eUICC according to an embodiment of the present disclosure.

FIG. 8 illustrates a method in which an eUICC determines profile processing using default profile information in an initialization process between a UE and an MEP eUICC according to an embodiment of the present disclosure.

An MEP-support removable eUICC may be an eUICC that is inserted into another UE before being inserted into a UE in FIG. 8 and has performed the procedure described above in FIG. 6.

In operation 805, when the MEP-support eUICC is inserted into the UE, the eUICC may determine whether the corresponding UE is a UE supporting an eUICC function through predetermined information received from the UE. As to whether the UE supports the eUICC function, in the initialization process between the UE and the MEP eUICC as described above in FIG. 5, the eUICC may receive a TERMINAL CAPABILITY Command message from the UE, and may determine that the UE does not support the eUICC function when "83" tag is not included as an identifier indicating eUICC-related capabilities in the TERMINAL CAPABILITY Command message received from the UE. In operation 815, when the eUICC determines that the UE does not support the eUICC function, the eUICC may identify whether there is an enabled profile.

Meanwhile, when the "83" tag is included in the TERMINAL CAPABILITY Command message received from the UE, the eUICC may determine that the UE supports the eUICC function in operation 805. However, when a command for channel open is received without an identifier indicating that the eUICC has entered the MEP mode in a command APDU received from the UE afterward in operation 810, the eUICC determines the UE as a MEP-nonsupport UE and checks whether there is an enabled profile in operation 815.

The modem may transmit the command APDU by including identification information indicating determination of the operation in the MEP mode in a header of the command APDU. When the header of the command APDU includes a class (CLA) referring to MANAGE PORT and an instruction code (INS) indicating a request for initialization of MANAGE PORT as the identifier that indicates entering the MEP mode, or when the header of the command APDU includes the CLA referring to MANAGE CHANNEL and the INS indicating a connection to a logical interface as the identifier that indicates entering the MEP mode in operation 810, the eUICC may determine to enter the MEP mode in operation 840.

In operation 815, when the corresponding identifier is not received, the eUICC may determine whether there is an enabled profile and process the operation as follows.

In operation 835, when there is no enabled profile as a result of the determination, the eUICC operates as a general eUICC that does not support MEP defined in SGP.22 and processes subsequent operations.

In operation 820, when there is the enabled profile, it is determined whether there is one enabled profile.

As a result of the determination, when there is only one enabled profile, the eUICC maintains the state of the profile in the enabled state in operation 825 and operates as the general eUICC that does not support MEP defined in SGP.22 to process subsequent operations in operations 835.

As a result of the determination, when there are two or more enabled profiles, the eUICC identifies stored information on the profile configured as the default profile, and changes the state of the remaining profiles other than the default profile to a disabled state in operation 830. The eUICC may process the change to the disabled state without receiving an explicit command for the disabled profile received from the LPA, and may process the changed to the disabled state without transmitting the refresh command for the reset to the modem. The eUICC that has changed the state of the remaining profiles except for the default profile to the disabled state operates as a general eUICC that does not support MEP defined in SGP.22 and processes subsequent operations in operation 835.

When the "83" tag is included in the Terminal Capability command message received from the UE, and the command APDU received from the UE includes an identifier indicating entry into the MEP mode, the eUICC may determine the operation in the MEP mode in operation 810. A method in which the eUICC enters the MEP mode and handles the profile with reference to the default profile information in operation 840 will be described later in detail with reference to FIG. 10.

Figure 9:
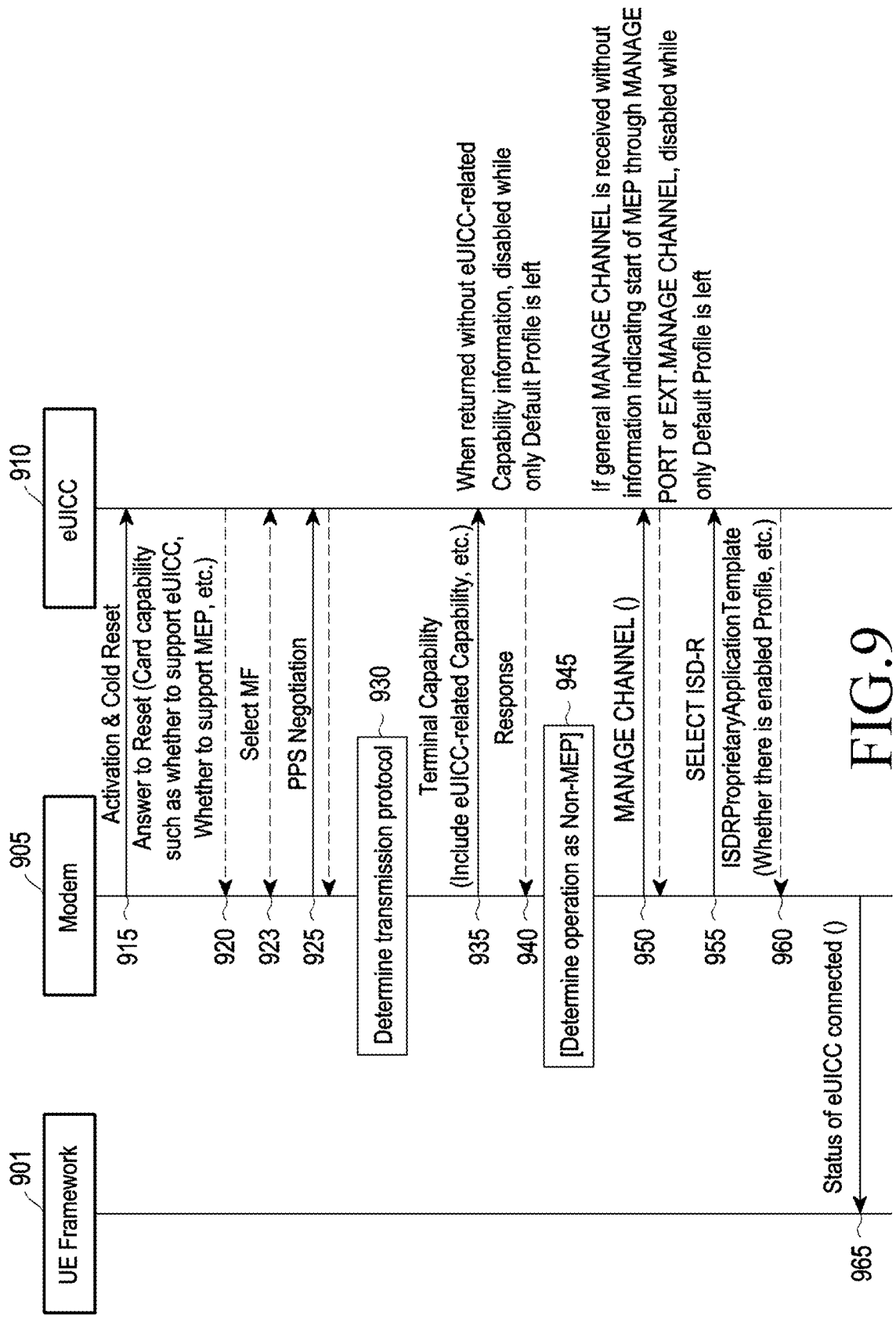
FIG. 9 illustrates a method of processing profile handling with reference to default profile information in an eUICC when operating as a general eUICC in FIG. 8 according to an embodiment of the present disclosure.

FIG. 9 illustrates a method of processing profile handling with reference to default profile information in an eUICC when operating as a general eUICC in FIG. 8 according to an embodiment of the present disclosure.

FIG. 9 schematically illustrates an example of an initialization process between a UE and an eUICC in a wireless communication system, and describes a procedure for handling the profile by referring to the default profile information in the eUICC and operating as a general eUICC.

Referring to FIG. 9, a modem 905 may identify whether an eUICC 910 is inserted through reception of a response to a periodic STATUS COMMAND or an electrical signal according to the eUICC insertion, and may recognize that the eUICC is inserted when the eUICC 910 is inserted into a UE. In FIG. 9, an MEP-support removable eUICC 910 may be an eUICC that has been inserted into another UE before being inserted into the UE and has performed the procedure described above in FIG. 6. In operation 915, the UE performs activation and cold reset to configure an operating environment for operation with the eUICC such as power supply, clock synchronization, current, and voltage to use the eUICC. In operation 920, when the configuration of the operating environment for using the eUICC is completed, the eUICC 910 returns an answer to reset (ATR) message to the modem 905. The ATR message is a first message the eUICC transmits to the UE, and message blocks consisting of up to 32 bytes are transmitted in a continuous chain.

In operation 920, the eUICC 910 may return, to the UE, the ATR message by including whether to support eUICC functionality defined in GSMA SGP.22 in one of the message blocks defined as interface byte in the message blocks of the ATR message. Meanwhile, the eUICC 910 may include a supported transport protocol and information indicating whether the transport protocol can be changed in the ATR message and then return, to the UE, the ATR message. The modem 905 may determine to use the transfer protocol supported by the eUICC as it is according to information included in the received ATR message. Alternatively, when there is an identifier for whether the transfer protocol can be changed in the ATR message, by additionally transmitting a request for determination of transfer protocol and parameter to the eUICC 910, the modem 905 may negotiate a transfer protocol to be used between the modem 905 and the eUICC 910 in operation 925, and finally determine the transfer protocol to be used by the modem 905 in operation 930.

After receiving the ATR, the modem 905 may implicitly select a master file (MF) of the eUICC 910 in operation 923.

The MEP support eUICC 910 may process to display only elementary files (EFs) of the MF level as a default file system when there is no enabled profile, and may further process to display only a default file system and file systems for one default profile when there is more than one enabled profile in the eUICC 910, so that the UE can selectively process the default profile at the corresponding time point. Alternatively, when there is more than one enabled profile in the eUICC 910, the eUICC 910 may process not to show file systems for all the enabled profiles at the corresponding time point even if there is a default profile. Thereafter, in a case in which the eUICC 910 receives terminal capability without an identifier for eUICC support or without an identifier for eUICC support and MEP support in operation 935, or when the terminal capability is received without initialization information by the MEP in operation 950, only the file system of the default profile may be additionally displayed in the default file system. As will be described later, in operation 935 or operation 950, when only the default profile is left and there are other enabled profiles, the eUICC may disable the other enabled profiles. In operation 935 or operation 950, additionally displaying only the file system of the default profile by the eUICC 910 may be performed before or after, when there are other enabled profiles, deactivation of the other enabled profiles.

The UE and the eUICC 910 may transmit an application protocol data unit (APDU) message using either T=0 or T=1, which is a transfer protocol defined in ISO 7816-3, through operation 930. The APDU is a data unit composed of a pair of a command and a response, and is used for message processing between other applications in an application. The modem 905 may allow the eUICC-related capability in the UE defined in SGP. 22 such as whether the UE supports LTA, whether the UE supports enterprise function, whether the UE supports MEP, etc., to be included in the terminal capability and may transmit the terminal capability to the eUICC 910 in operation 935. As described above, whether the UE has the eUICC-related capability may be determined by the "83" tag defined in the terminal capability template (tag "A9"). The UE may inform whether the UE supports the MEP through bits about whether the MEP is supported in the "83" tag, or whether there is a newly defined tag (not "83" tag) for the MEP in the terminal capability template (tag "A9").

In operation 940, the eUICC 910 may allow a response code (status word) for the processing result to be included in a APDU header as a reply to the terminal capability, and may transmit the APDU header. The response code may be one of the terminal capability reply response codes defined in European telecommunication standards institute (ETSI) technical specification (TS). For example, when the eUICC 910 transmits default file information or the like as an example of additional information to the modem 905, the eUICC 910 may transmit a response code indicating that there is additional data.

The eUICC 910 may determine whether the MEP is supported in the received terminal capability, may determine whether there is an enabled profile in the eUICC 910 when there is no identification information supporting the MEP, and may determine a maximum of one profile to be enabled. When only one profile is enabled, the enabled state of the enabled profile may be maintained as described above. When two or more profiles are enabled, the eUICC 910 may selectively identify whether there is a profile configured as a default profile through the stored profile information or the stored configuration information, may change all the states to be disabled in the case of the profile(s) that are not the profiles configured as the default profile, and may process subsequent operations as in a general eUICC that does not support MEP. When the eUICC 910 operates to leave only one profile and implicitly changes the other profile state(s) to a disabled state without the user's consent, the eUICC 910 may complete the deactivation process without transmitting a refresh command according to the profile state change to the modem 905.

On the other hand, when the eUICC 910 identifies the tag value for the eUICC-related capability or identifies the tag and the MEP support identifier for the eUICC-related capability from the received terminal capability, the eUICC 910 does not determine a profile to be kept enabled in operation 935, but may determine to select one or more profiles to be kept enabled at a time point when an identifier indicating the operation in the MEP mode is received or at a specific time point after the time point. As described above, the UE may determine to operate in a non-MEP mode in operation 945. When the UE operates in the non-MEP mode, the UE does not transmit an extended MANAGE CHANNEL including an identifier that can distinguish a logical interface to a MANAGE PORT or MANAGE CHANNEL and may transmit a command APDU for MANAGE CHANNEL open transmitted for channel open at the time of initialization between the general eUICC and the UE in operation 950. The eUICC 910 having received the APDDU may recognize that there is no identifier for the MEP support described above in FIG. 9, and may determine that the operation may be processed in the general eUICC rather than the MEP mode.

When it is determined that the eUICC 910 operates as a general eUICC, the eUICC 910 may determine whether there is an enabled profile in the eUICC 910 and may determine a maximum of one profile to be enabled. When only one profile is enabled, the enabled state of the enabled profile may be maintained as described above. When two or more profiles are enabled, the eUICC 910 may selectively identify whether there is a profile configured as a default profile through information of a stored profile or configuration information, and the eUICC itself may change all of the profiles to be disabled if the profiles are not the profiles configured as the default profile and may configure to process a subsequent operation as in the general eUICC. Meanwhile, the profile configured as the default profile may be defined as the enabled profile having the lowest port number among the enabled profiles. For example, in a case in which the removable MEP-support eUICC 910 is previously mounted in a first MEP-support UE and performs the operation as shown in FIG. 6, when an ISD-R dedicated port is not used, the default profile having the lowest port number among the enabled profiles may be a profile having port #0. Alternatively, when the ISD-R dedicated port is used, the ISD-R dedicated port uses port #0, and the default profile having the lowest port number among the enabled profiles may be a profile having the port #1.

When the eUICC 910 implicitly changes the other profiles to be disabled without the user's consent by determining only one profile left in enabled state in the initialization process between the UE and the eUICC 910, the eUICC 910 may complete the deactivation process without transmitting a refresh command message according to the profile state change (i.e., change to the disabled state) to the modem 905. In addition, when the logical interface is not supported, the eUICC 910 may recognize one interface generated by the modem 905 with the eUICC 910 as port #0, and may change the port number of the default profile in the initialization process to the port #0 to process mapping.

The eUICC 910 may return a normal response to an open command for the logical interface received from the modem 905, for example, a MANAGE CHANNEL OPEN command APDU, so that a basic channel generation for APDU transmission between the modem 905 and the eUICC 910 in the logical interface is completed. On the other hand, when the modem 905 needs to receive additional information from the eUICC 910 in the initialization process between the UE and the eUICC, the modem 905 may selectively transmit a SELECT command (App ID of ISD-R) to obtain additional information in operation 955. When the eUICC 910 receives the command APDU, as an example, the eUICC 910 returns an ISDRPoprietaryApplicationTemplate in operation 960 to provide additional information including the presence or absence of an enabled profile in the eUICC 910 to the modem 905. The modem 905 may transmit the additional information received from the eUICC 910 to a UE framework 901 in operation 965 to provide the additional information to be utilized in the application or system of the UE. It is shown in FIG. 9 as if the transmitted additional information is integrated by the modem 905 and transmitted to the UE framework 901 after the ISDRProprietaryApplicationTemplate is received, but the modem 905 may sequentially or collectively transmit the additional information at a specific time after the time of obtaining the additional information from the eUICC 910.

Figure 10A:
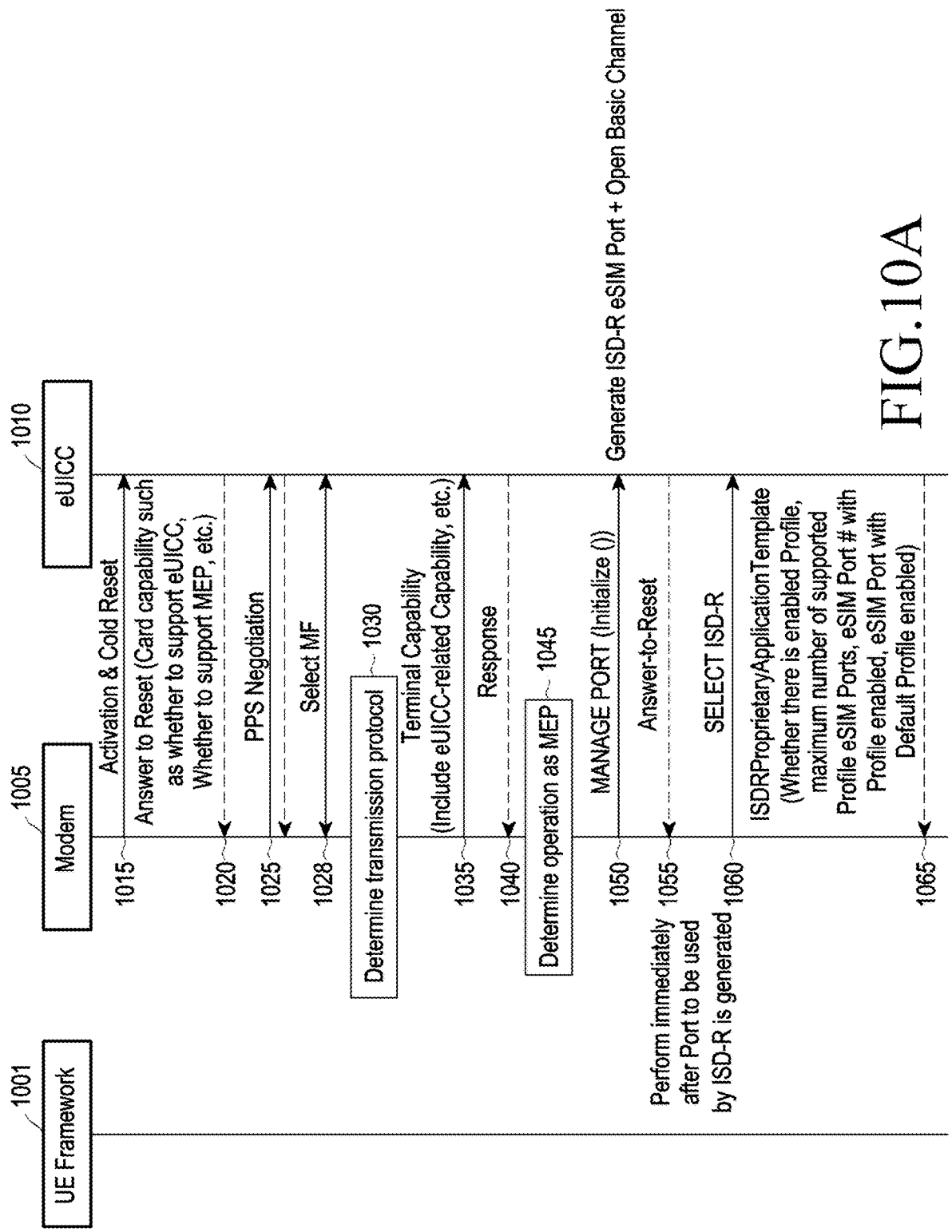
FIGS. 10A and 10B illustrate a method of processing profile handling with reference to default profile information in an eUICC and a UE when operating as an MEP eUICC in FIG. 8 according to an embodiment of the present disclosure.
Figure 10B:
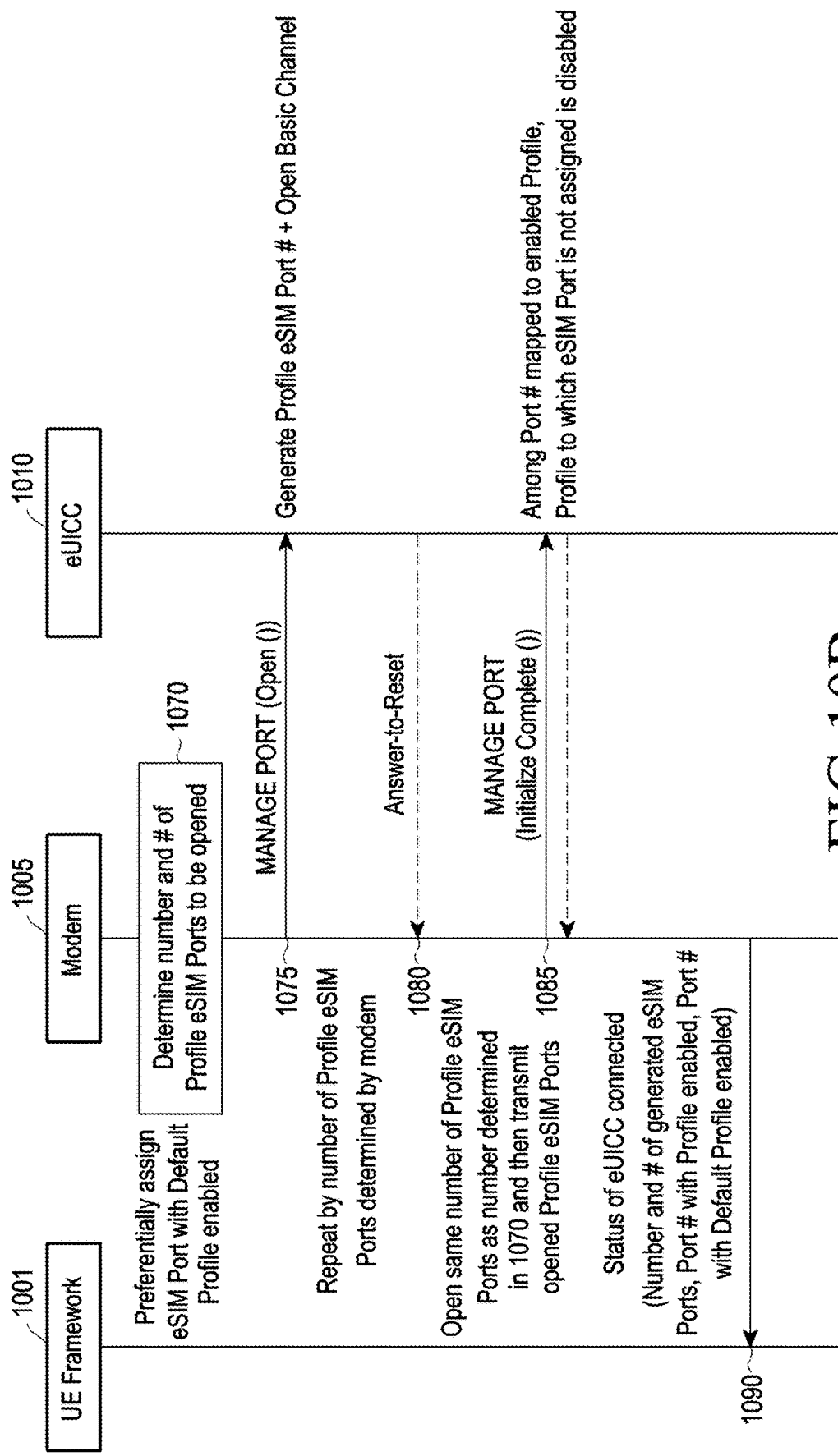

FIGS. 10A and 10B illustrates a method of processing profile handling with reference to default profile information in an eUICC and a UE when operating as an MEP eUICC in FIG. 8 according to an embodiment of the present disclosure.

Referring to FIGS. 10A and 10B, when the eUICC 1010 is inserted into a UE, a modem 1005 recognizes the eUICC 1010 and performs activation and cold reset for configuring an operating system for the operation with the eUICC 1010 such as power supply, clock synchronization, current, voltage, etc., in order to use the eUICC in operation 1015. When the configuration of the operating environment for using the eUICC 1010 is completed, the eUICC 1010 returns an ATR message to the modem 1005 in operation 1020. The ATR message is a first message the eUICC 1010 transmits to the UE, and the ATR message includes message blocks consisting of up to 32 bytes transmitted in a continuous chain.

The eUICC 1010 may include whether to support eUICC functionality defined in GSMA SGP.22 as one of the message blocks defined as interface bytes in the message blocks of the ATR message and return the ATR message to the UE in operation 1020. Meanwhile, the eUICC 1010 may return the ATR message including information indicating a supported transfer protocol and information indicating whether the transfer protocol can be changed together. The modem 1005 may determine to use the transfer protocol supported by the eUICC as it is according to information included in the received ATR message. Alternatively, when there is an identifier for whether the transfer protocol can be changed in the ATR message, by additionally transmitting a request for determining a transfer protocol and parameter to the eUICC 1010, the modem 1005 may negotiate a transfer protocol to be used between the modem 1005 and the eUICC 1010 in operation 1025, and may finally determine the transfer protocol to be used by the modem 1005 in operation 1030.

In FIGS. 10A and 10B, after receiving the ATR, the modem 1005 may implicitly select a MF of the eUICC 1010 in operation 1028. An MEP-support eUICC 1010 may process to display only elementary files (EFs) of the MF level as a default file system when there is no enabled profile, and may further process to display only a default file system and file systems for one default profile when there is more than one enabled profile in the eUICC 1010, so that the UE can select the default profile at the corresponding time point. Alternatively, when there is more than one enabled profile in the eUICC 1010, the MEP-support eUICC 1010 may process not to show file systems for all the enabled profiles at the corresponding time point even if there is a default profile.

The UE and the eUICC may transmit an APDU message using either T=0 or T=1, which is a transfer protocol defined in ISO 7816-3, through operation 1030. The APDU is a data unit composed of a pair of a command and a response, and is used for message processing between other applications in an application. The modem 1005 may allow the eUICC-related capability in the UE defined in SGP. 22 such as whether the UE supports LPA, whether the UE supports enterprise function, whether the UE supports MEP, etc., to be included in the terminal capability and may transmit the terminal capability to the eUICC 1010 in operation 1035. In addition, as described above, whether MEP is supported may be added as a separate tag inside or outside the eUICC support capability in the template of the terminal capability, and transmitted. The eUICC 1010 having received the terminal capability message may recognize whether the UE is a UE supporting eUICC and additionally supports MEP as described above in FIG. 9, and thus may determine a configuration value in the eUICC and may return a normal response to the command APDU to the modem 1005 in operation 1040. The normal response code may be one of the terminal capability reply response codes defined in section 10.2.2 status words of the commands of ETSI TS 102.221. For example, the eUICC 1010 may transmit, for example, default profile information as additional information to the modem 1005. Meanwhile, in operation 1030, the configuration determination in the eUICC may include the following.

When there is no indication of whether MEP is supported in the terminal capability or it is displayed as MEP-non-support: As described above in FIG. 9, enabled profiles other than the default profile are processed to be disabled, and when the file system of the default profile is processed not to be displayed in operation 923 of FIG. 9, the file system of the default profile is processed to be displayed in the default file system.

The eUICC 1010 may also process the configuration determination for the file system at the time point when the eUICC 1010 receives the command APDU capable of determining the operation start with the MEP, not at the time point when the terminal capability is received.

The modem 1005 may determine the operation as MEP through predetermined information for determining the eUICC functionality support and the MEP support collected through the ATR message in operation 1045. The operation determination of the modem 1005 in the MEP mode may be performed a specific point in time after the modem 1005 recognizes whether the eUICC 1010 supports MEP during the initialization process between the UE and the eUICC 1010, and when the operation in the MEP mode is determined, the modem 1005 may include identification information indicating that the operation in the MEP mode is started in a header of a command APDU and may transmit the command APDU to the eUICC 1010 in operation 1050. The time point at which the operation is determined in the MEP mode and the time point at which the operation is started in the MEP mode may be the same time or may not be the same time.

Although the present disclosure has been described as an example of the command APDU having the MANAGE PORT as the INS, the present disclosure is not limited thereto, and it can also be determined as the APDU that can be identified as a logical interface management. An example of the transmission of command APDU may include a CLA referring to an MANAGE PORT and an INS indicating the initialization of the MANAGE PORT in the header of the command APDU. Alternatively, although not shown in FIG. 10, when the header of the command APDU includes the CLA referring to MANAGE CHANNEL and the INS indicating a connection to a logical interface, it may be determined that the MEP mode is started. The eUICC 1010 having received the identification information indicating that operation in the MEP mode is started may generate an eSIM port and return a response APDU to the modem 1005 for generating the eSIM port. The generated eSIM port may be generated in a method in which the eUICC (1010) maps the interface used for communication between the eUICC 1010 and the modem 1005 in the previous operation to the port.

In this case, the eUICC 1010 may maintain to display only the file system that has been processed to be displayed to the modem 1005 during SELECT MF in operation 1028. As the value of the returned ATR, a part or all of the ATR message transmitted in operation 1015 may be returned in operation 1055. FIG. 10 illustrates an operation of selecting SELECT ISD-R after operation 1050 for convenience of explanation, and illustrates that the eUICC generates an ISD-R eSIM port as a result of operation 1050. However, depending on the configuration in the UE or eUICC, the port initially generated between the UE and the eUICC may not be limited to the eSIM port used by ISD-R. For example, the ISD-R does not use the port initially generated between the UE and the eUICC according to the configuration of the UE or eUICC, and the UE can select and use another eSIM port as the port used by the ISD-R, or the eUICC elect and use another eSIM port as the port used by the ISD-R.

After entering the MEP mode, the modem 1005 may generate an APDU transmission channel with the ISD-R and select the ISD-R in operation 1060, so that the modem 1005 may additionally receive, from the ISD-R, ISDRProprietaryApplicationTemplate (presence and absence of enabled profile, the maximum number of supported profile eSIM ports, eSIM port number(s) with profile enabled or eSIM port number(s) with an additional profile enabled in addition to the default profile, eSIM port number with the default profile) in operation 1065 and obtain information required for port generation and allocation. In addition, the eUICC 1010 may transmit the ISDRPrprietaryApplicationTemplate including information on whether the eUICC is removable. Although the eSIM port number for which the default profile is enabled is specified as the information on the default profile in operation 1065, it is not limited thereto, and it is also possible to indicate and provide the information on the default profile in one of the following methods:

eSIM port number with the default profile enabled;
ICCID of the default profile;
ICCID of the default profile and mapped port number;
PPR1 profile ICCID;
eSIM port number with PPR1 profile enabled;
Default port number (displayed only when there is an enabled profile); and/or
Display the eSIM port number as a sequence, but indicate the default port first.

The modem 1005 having received the information on the default profile may designate the number of eSIM ports and eSIM port numbers to be opened by combining the information received with the ISDR ProprietaryApplicationTemplate with the information obtained from the UE.

On the other hand, when the removable MEP-support eUICC 1010 does not support PPR1 or the PPR1 profile is not installed, the default profile or the port number on which the default profile is enabled may not be transmitted from the ISDR ProprietaryApplicationTemplate to the modem 1005. On the other hand, some or all of the presence or absence of the enabled profile, the maximum number of supported profile eSIM ports, the eSIM port number with the profile enabled, and the eSIM port number with the default profile enabled, an ISD-R selection method, information on whether the eUICC is removable, which are obtained through ISDR ProprietaryApplicationTemplate, may be returned through an ATR message (in operation 1020), a reply value of terminal capability (in operation 1040), or a template of the MF file of the eUICC 1010 selected by default in the modem 1005 after the ATR message is received.

The modem 1005 may determine the number of profile eSIM ports as the smaller number among the maximum number of available basebands and the maximum number of supported profile eSIM ports transmitted from the eUICC 1010, and may determine the port number to be opened with reference to the enabled eSIM port number in operation 1070. The maximum number of available basebands may be equal to or different from the number of supported basebands of the modem 1005. For example, when the total number of basebands supported by the modem 1005 is three, but one is occupied by a physical SIM card, the maximum number of available basebands may be two. The modem 1005 having determined the number of profile eSIM ports and the port number to be opened may transmit a port open command to the eUICC 1010 by the number of the profile eSIM ports in operation 1075. In addition, in a case in which the modem 1005 determines the port number, when receiving port information mapped to the default port, the eSIM port may be opened by assigning the corresponding port number first. The eUICC 1010 having received information on the eSIM port opened by the modem 1005 may generate an eSIM port, and may process the file system of the profile to be visible when the profile is mapped to the eSIM port and enabled.

When there is no profile mapped to the eSIM port and enabled, only the default file system may be visible at the time of selecting the eSIM port. Additionally, after opening one basic channel to the eSIM port, the eUICC 1010 may return, to the modem 1005, a response APDU to the generation of the eSIM port in operation 1080. When the default profile or the port number with the default profile enabled is not received in operation 1065, the modem 1005 may generate a port without considering the default profile, may map the profiles in the enabled state to the ports as many as the available number of ports (that is, the number of opened ports for the profile opened by the modem 1005) in the order of the lowest number among the ports for which the profile is enabled in the eUICC 1010, and may determine to keep the other profiles enabled or disabled according to the configuration of eUICC 1010.

As the reply value of the ATR returned in operation 1080, a part or all of the ATR message transmitted in operation 1020 may be included and returned. For example, when the modem 1005 generates a port for assigning to the default profile in operation 1075 after generating the ISD-R eSIM port, the eUICC may process the file system for the default profile to be visible to the modem 1005 while mapping the port to the default profile. Thereafter, when the modem generates an additional port and maps the additional port to the enabled profile in the eUICC 1010, the file system for the mapped profile enabled may be displayed to the modem 1005.

When the port numbers assigned to the profiles enabled in the eUICC 1010 are eSIM port #1, eSIM port #3, and eSIM port #5, respectively, and, among them, the default port #3 is received as the port number with the default profile enabled, and there are two connectable basebands in the modem 1005, the modem 1005 may open up to 2 profile eSIM ports. In this case, a profile eSIM port open command transmitted to the eUICC 1010 from the modem 1005 may include the port #3. For example, when the eSIM port number with the default profile enabled is #3, the modem 1005 may preferentially open the eSIM port by designating the eSIM port number as #3 as in C-APDU<CLA=MANAGE PORT, INS=Open, PI=Port #3>, and may allocate the eSIM port in the order of the next lower number among the numbers mapped with the eSIM port, provided by the eUICC 1010, in which the profile is enabled.

For example, the following profile eSIM port open command transmitted to the eUICC 1010 may include eSIM port #1 and may be transmitted. The eUICC 1010 having received the profile eSIM port open command may map the default profile enabled in the eSIM port #3 to the received eSIM port #3, and may map the profile enabled in the eSIM port #1 to the received eSIM port #1. The modem 1005 may open the number of ports as many as the number of profile eSIM ports determined previously and when all eSIM port generation is complete in the modem 1005, the modem 1005 may transmit an indicator informing the eUICC 1010 that all of the eSIM port generation for operation as the MEP has been completed. For example, the modem 1005 may transmit a MANAGE PORT (initialization complete) message to the eUICC 1010 in operation 1085.

Meanwhile, the modem 1005 may inform the eUICC 1010 of the number of eSIM ports to be generated at a specific time point in the above-described procedure instead of notifying that all eSIM ports have been generated.

As described above in FIG. 9, when the modem 1005 does not acquire the port number assigned to the default profile, the modem 1005 may determine a port number without considering the default profile port number and inform the eUICC 1010 of the determined port number. When the port number allocated in the first opened MANAGE port command APDU is different from the port number of the default profile stored in the eUICC 1010, the eUICC 1010 may transmit the reply value including the port number of the stored default profile to the modem 1005. The modem 1005 may change the opened port number with the received port number in the reply value.

Alternatively, the eUICC 1010 may change the eSIM port number of the default profile stored by the eUICC 1010 to the eSIM port number received from the modem 1005 and stored the changed eSIM port number, and may connect the default profile to the changed eSIM port number.

As also described above in FIG. 9, when there is no configuration information for the default profile in the eUICC 1010, the eUICC 1010 maintains the enabled state of the profile(s) in the order of the lowest number among the eSIM port numbers, in accordance with the number of ports allocated to be usable in the profile among the number of ports opened by the UE, and may determine to keep the profiles, which are not mapped to the eSIM port, enabled or disabled. When a part of the number of ports that can be assigned to the eUICC 1010 in the UE is not for the purpose of using with the profile, the UE may inform the eUICC 1010 of the corresponding information. As an example, the UE may transmit, to the eUICC 1010, the command APDU for Get configuration including information on the number of ports that can be opened by the UE with the eUICC 1010 and the number of openable ports for the profile among these as the data of the command APDU.

When the eUICC 1010 receives an indicator informing the eUICC 1010 that the generation of all eSIM ports is complete, for example, a MANAGE PORT (initialization complete) message, the eUICC 1010 may disable a profile to which the eSIM port is not allocated among port numbers mapped to a profile enabled by itself. For example, the profile assigned to port #5 may be changed in a disabled state by the eUICC 1010. Meanwhile, as described above, the modem 1005 may inform the eUICC 1010 of the number of eSIM ports to be generated at a specific time point in the above-described procedure instead of notifying that all eSIM ports have been generated. In this case, when receiving the number of eSIM ports by referring to information on the number of eSIM ports to be generated by the modem 1005, the eUICC 1010 may disable the profiles to which the eSIM ports are not assigned.

When the eUICC 1010 implicitly processes the deactivation of the profile without the user's consent as the operation of the initialization process between the UE and the eUICC 1010, the eUICC 1010 may complete the deactivation process without transmitting a refresh command according to the profile state change to the modem 1005. On the other hand, the modem 1005 may provide information such as the eSIM port, the generated profile eSIM port number, the port number with the default profile enabled, etc., to the UE framework 1001 through the ISD-R finally determined with reference to the information obtained from the eUICC 1010 in operation 1090, so that the corresponding information can be utilized by the application (including LPA) or the system of the UE.

Figure 11A:
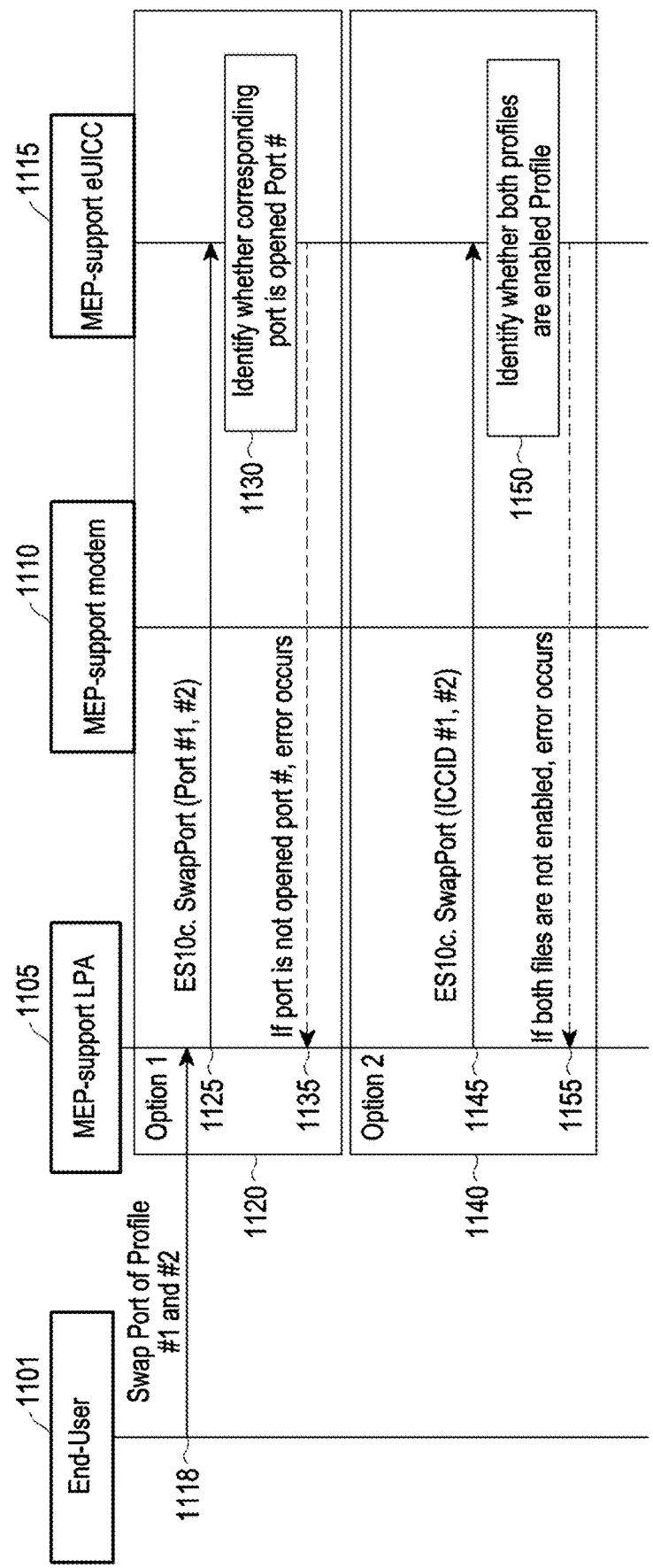
FIGS. 11A and 11B illustrate a method of processing a swap of a port to be used between profiles in a UE and an eUICC operating in an MEP mode according to an embodiment of the present disclosure.
Figure 11B:
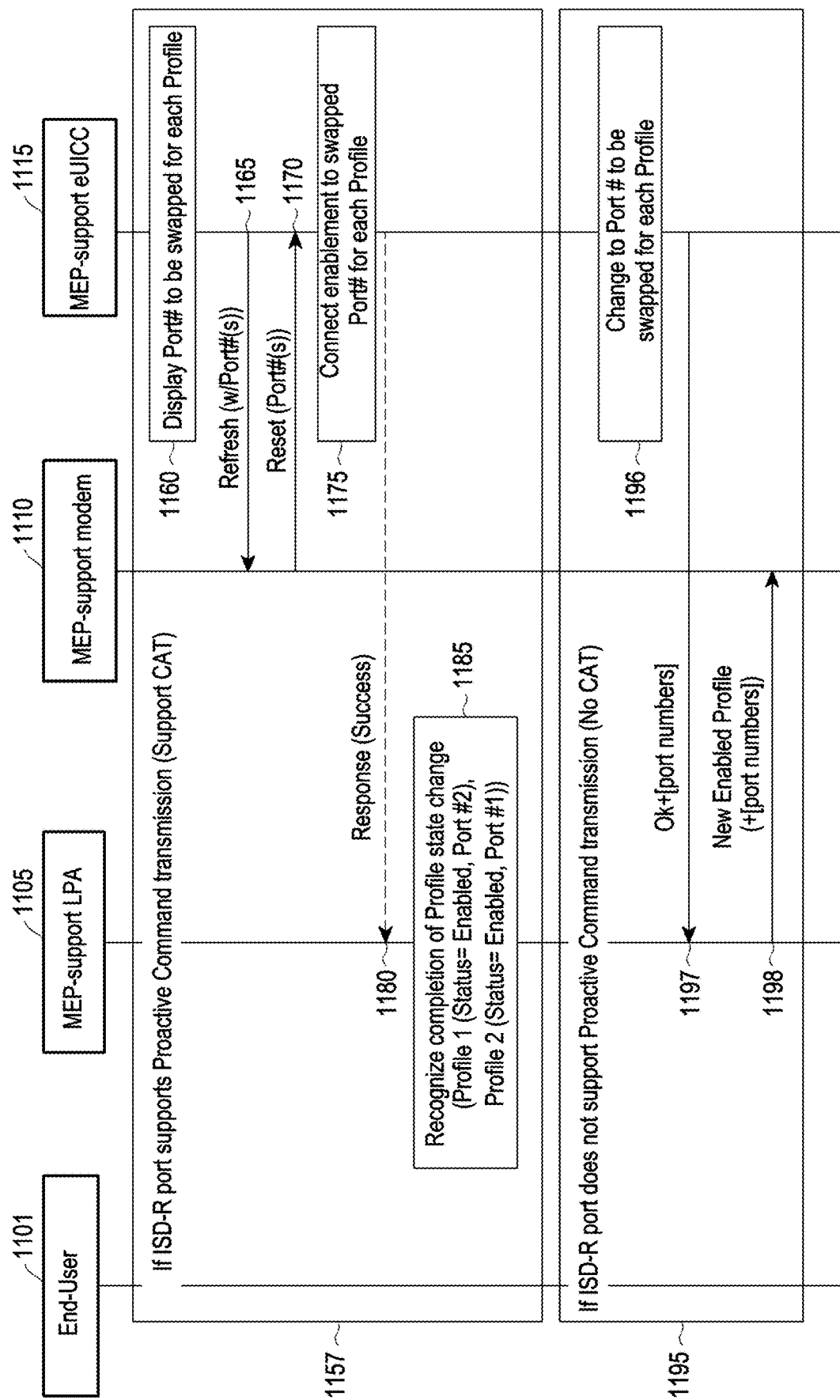

FIGS. 11A and 11B illustrates a method of processing a swap of a port to be used between profiles in a UE and an eUICC operating in an MEP mode according to an embodiment of the present disclosure.

For convenience of description, a case in which profile 1 is enabled in eSIM port #2 and profile 2 is enabled in eSIM port #1 as shown in FIG. 5 above will be assumed, and it is assumed that profile 1 is a profile with PPR1 configured. There may exist a case where an end-user 1101 wants to change basebands used by the profile 1 and the profile 2. That is, referring to FIG. 5, when the profile 1 uses 5G and the profile 2 uses 4G, the end-user 1101 may select a user menu for the port change to use 4G for the profile 1 in an LPA 1105 or an SIM management application with the LPA 1105 integrated. In the prior art, when receiving an input from the user (e.g., clicking a menu or changing the location between profiles in a UI), the eUICC 1115 may first disable the state for the profile 1, but since the profile cannot be disabled, the eUICC 1115 returns an error about processing inability to the LPA 1105, and the LPA 1105 cannot process a corresponding command.

Referring to FIGS. 11A and 11B, the end-user 1101 may select the user menu for the port change to use 4G for the profile 1 in the LPA 1105 or the SIM management application in which the LPA 1105 is integrated in operation 1118. The MEP-support LPA 1105 having received a corresponding message may generate a command for port-to-port swap and transmit the generated command to the eUICC 1115.

The above command may be one of messages such as ES10c. SwapPort (Port #1, #2) or ES10c. SwapPort (ICCID #1, #2).

The order entered in Swap Port( ) may indicate the order in which port changes are to be processed. For example, in case of SwapPort (Port #1, #2) of option 1 (1120), the port #1 may be changed to the port #2, and in case of SwapPort (ICCID #1, #2) of option 2 (1140), it may be recognized that the port #1 with ICCID #1 enabled may be first changed to the port #2 with ICCID #2 enabled. In the above case, sequential processing means that the eUICC requests a refresh command (reset or profile state change) from the modem in the order of the port #2, which is the port to be changed and used by the port #1 or the ICCID #1 and then the port #1.

In option 1 (1120), the eUICC 1115 may receive ES10c. SwapPort (Port #1, #2) in operation 1125. The eUICC 1115 having received ES10c. SwapPort (Port #1, #2) may identify whether the requested ports #1 and #2 are both open and valid ports in operation 1130. As a result of the identification, when at least one of the ports is not open, the eUICC 1115 may return an error message to the LPA 1105 in operation 1135. For example, an error reason such as Error-NoPort, Port # may be returned in operation 1135.

In option 2 (1140), the eUICC 1115 may receive ES10c. SwapPort (ICCID #1, #2) in operation 1145. The eUICC 1115 having received ES10c. SwapPort (ICCID #1, #2) may identify whether all profiles corresponding to ICCIDs #1 and #2 are enabled in operation 1150. As a result of the identification, when even one of the profiles corresponding to ICCID #1 and #2 is not enabled, the eUICC 1115 may return an error message to the LPA 1105 in operation 1155. For example, in operation 1155, an error reason such as profile-NotInEnabledState, ICCID may be returned. Upon receiving the error message, the LPA 1105 may notify/end the processing method upon receiving the error.

In addition, although not shown in FIG. 11, by combining option 1 and option 2 with option 3, the ICCID #1 and the port #2 changed to be used by the ICCID #1 may be indicated in a pair as a parameter of Swap Port ( ) (e.g., Swap Port (ICCID #1, Port #2). In this case, it is determined whether the ICCID #1 is enabled, whether the port # to be changed is open, and whether there is another enabled ICCID other than the ICCID #1. When any of these are not satisfied, an error message may be returned to the LPA and may be completed.

As a result of determining through operation 1130 of option 1 (1120) or operation 1150 of option 2 (1140) according to the received SwapPort Command, when processing is possible, the eUICC 1115 may indicate that port information may be changed in the metadata of the profile from the stored profile information (e.g., profile to be enabled on port #2 in the metadata of profile 1 (ICCID #1} or profile to be enabled on port #2 in the metadata of profile 2 (ICCID #2)) in operation 1160, and may process refresh for eSIM ports included in SwapPort( ) in operations 1165 and 1170.

In operation 1165, one or a plurality of refresh commands may be transmitted. That is, a proactive command for one refresh may include a plurality of port numbers, or the proactive command for refresh may be transmitted for each port.

In operation 1170, reset may be performed for each target port to be changed.

Refresh and reset may include at least one of the following methods.

For example, the eUICC 1115 may request, to the modem 1110, Refresh including the port number to be changed through the sequential eSIM port or the ICCID-enabled eSIM port in the SwapPort( ) and the modem 1110 may process the port refresh sequentially starting from the port number to be changed. In other words, when option 1 (1120) is SwapPort (Port #1, #2) in operation 1165, the eUICC 1115 may request port refresh processing to the modem 1110 by transmitting the proactive command including port number to be changed through port #1, and may request port refresh processing to the modem 1110 by transmitting the proactive command including the port number to be changed through the port #2, thereby requesting a refreshing process on the ports to be changed.

As an example, in the reverse order included in Swap-Port( ) the eUICC 1115 may sequentially request refresh on the port reset through the eSIM port or the ICCID-enabled eSIM port to the modem 1110, and the modem 1110 may process the port refresh according to the order of the eSIM port to be changed. In other words, the eUICC 1115 may transmit a REFRESH proactive command corresponding to the port reset without the port number in the order of the port #2 and the port #1. The modem 1110 having received the corresponding message performs a reset on the port with eUICC 1115.

For example, through one of the eSIM ports used by the ISD-R or a dedicated port, the eUICC 1115 may transmit a request to start performing the REFRESH proactive command for the entire eUICC platform to the modem 1110. The modem 1110 having received the request may perform reset for the entire eUICC.

For example, as described above, through the port used by one ISD-R, the eUICC 1115 transmits two independent proactive commands including the port number to be changed and used by the profile to request the port refresh process to the modem 1110.

For example, through the port used by one ISD-R as described above, the eUICC 1115 transmits one proactive command including the port number to be changed and used by the profile to request port refresh processing from to modem 1110.

In addition, although not shown in FIG. 11, as another example of replacing operations 1165 and 1170, the eUICC 1115 may transmit one REFRESH proactive command on swap including a list of (existing port number and changed port number) through one of the eSIM ports used by the ISD-R, thereby requesting the port refresh to the modem 1110.

The modem 1110 having received the proactive command(s) may perform the refresh command for the port(s) or the entire platform. When the proactive command including multiple port numbers is received, the modem 1110 may perform a batch network release procedure for the received ports instead of deleting cache values after a network detach request for each port, and may start a new eUICC session through reset for each port after batch deleting the cache values for the ports. When the modem 1110 receives multiple refresh commands for port reset with one port number or without port number, the modem 1110 may sequentially perform refresh processing for each port. That is, the modem 1110 may release the network connection for the profile used for each port, and may delete the cache value and perform reset for each port.

When performing reset on the port(s) or platform as a result of the refresh process, the eUICC 115 may change mapping for the profile and the port in operation 1175, and may return a normal response result for the processing on the port change to the LPA 1105 in operation 1180.

The LPA 1105 having received the response may recognize that the profile-port mapping change has been normally completed in operation 1185 and may provide the processing result to the end-user 1101. Instead of operation 1180, after the reset is completed, it is possible for the LPA 1105 to identify whether the port-profile mapping of the eUICC 1115 has been normally completed through information of the profile returned through a GetProfileInfo( ) command in the eUICC 1115 and a template called when the ISD-R is selected.

Meanwhile, there may be a case in which the refresh command cannot be transmitted from the ISD-R port to the modem 1110 in operation 1195. In this case, the eUICC 1115 may change the port number for which the profile is enabled to the port number to be changed and enabled and may store the corresponding result in operation 1196.

Thereafter, the eUICC 1115 may return a success response message including the changed port numbers to be used by each profile to the LPA 1105 in operation 1197, or after adding the changed port numbers to the success response message, the LPA 1105 may transmit the corresponding result to the modem 1105 in operation 1198. The modem 1110 having received the corresponding result performs a batch network release procedure for the networks used by each existing profile, and may delete the cache values for the changed ports to perform reset on the changed ports in operation 1198. After performing reset, the modem 1110 may perform a network attach procedure by using profiles information enabled on the changed ports in the basebands connected to the changed ports.

Figure 12:
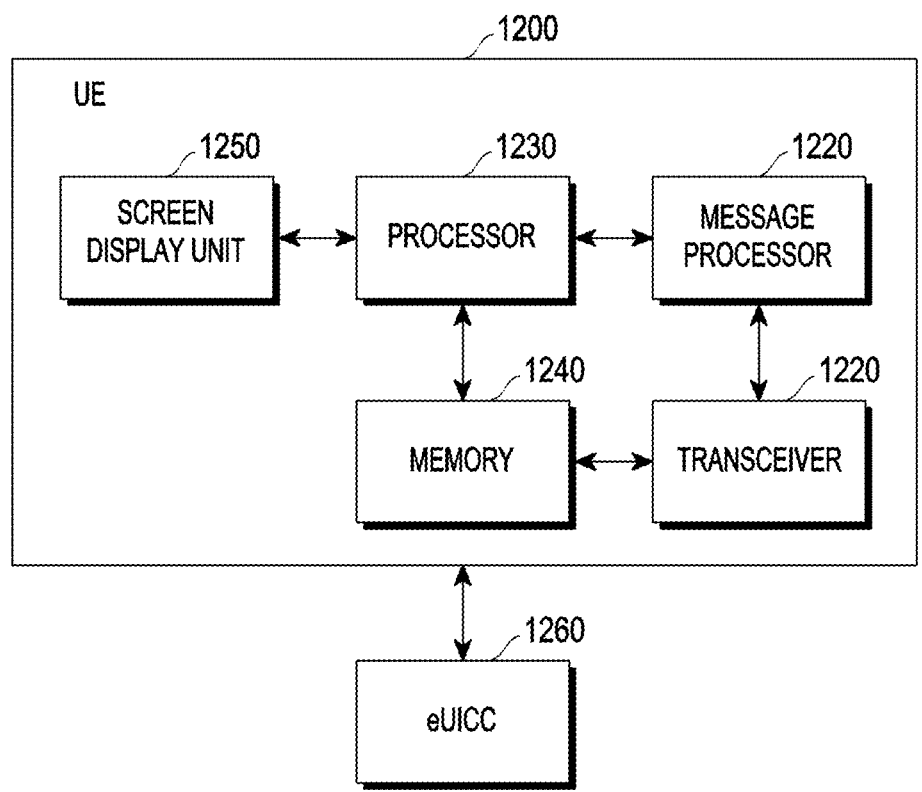
FIG. 12 schematically illustrates an internal structure of a UE in a wireless communication system according to an embodiment of the present disclosure.

FIG. 12 schematically illustrates an internal structure of a UE in a wireless communication system according to an embodiment of the present disclosure.

Referring to FIG. 12, a UE 1200 includes a transceiver 1210, a message processor 1220, a controller 1230, a memory 1240, and a screen display unit 1250. However, the components of the UE 1200 are not limited to the above-described example. For example, the base station may include more or fewer components than the aforementioned components. In addition, at least one component of the UE 1200 may be implemented in the form of one chip. According to some embodiments, the transceiver 1210 may perform a function for transmitting and receiving a signal through a wireless channel, such as band conversion and amplification of the signal. That is, the transceiver 1210 may include an RF processor that up-converts a baseband signal into an RF band signal, transmits the up-converted signal through an antenna, and down-converts the RF band signal received through the antenna into a baseband signal, and may further include a transmission filter, a reception filter, an amplifier, a mixer, an oscillator, a digital to analog converter (DAC), an analog to digital converter (ADC), and the like.

In addition, the transceiver 1210 may receive a signal through a wireless channel, output the received signal to the processor 1230, and transmit a signal output from the controller 1230 through a wireless channel. The transceiver 1210 may perform beamforming. For beamforming, the transceiver 1210 may adjust the phase and magnitude of each of signal transmitted and received through a plurality of antennas or antenna elements. In addition, the baseband processor in the transceiver 1210 may perform a conversion function between baseband signals and bit streams according to the physical layer standard of the system. For example, upon data transmission, the baseband processor generates complex symbols by encoding and modulating the transmitted bit streams. In addition, upon data reception, the baseband processor restores the received bit streams by demodulating and decoding the baseband signal provided from the RF processor. For example, in the case of orthogonal frequency division multiplexing (OFDM), when transmitting data, the baseband processor may generate complex symbols by encoding and modulating a transmission bit stream, and after mapping the complex symbols to subcarriers, may configure the OFDM symbols through inverse fast Fourier transform (IFFT) operation and cyclic prefix (CP) insertion In addition, upon data reception, the baseband processor may divide the baseband signal provided from the RF processor into OFDM symbol units, restore signals mapped to subcarriers through a fast Fourier transform (FFT) operation, and restore the received bit stream through demodulation and decoding.

The transceiver 1210 may be defined as a transceiver and may include a message transceiver. The message processor 1220 may perform an operation of transmitting data through the transceiver 1210 or operation of determining what kind of message the data transmitted or received through the transceiver 1210 is. For example, the message processor 1220 may determine whether the received message is a control message of a radio resource control (RRC) layer (including a system information block (SIB)) or a user data message. The message processor 1220 may be included in the controller 1230.

The controller 1230 controls overall operations of the UE 1200. For example, the controller 1230 transmits and receives a signal through the message processor 1220. In addition, the controller 1230 writes and reads data in a memory 1240. There may be at least one controller 1230. For example, the controller 1230 may include a communication processor (CP) that controls for communication and an application processor (AP) that controls an upper layer such as an application program. According to some embodiments, when there is operator configuration information for device change stored in the memory 1240 in advance, the controller 1230 may request the corresponding information from the memory 1240 and may display the requested information by a screen display unit 850 or may receive the information to perform an additional operation.

The controller 1230, the message processor 1220, and the transceiver 1210 may control the UE 1200 to access a network of a selected operator according to a user or UE configuration. In addition, according to some embodiments, the controller 1230 may match data record read through the memory 1240 or information collected through the controller 1230, the message processor 1220, and the transceiver 1210 to perform a process in which the UE infers information that can be referred to for service selection. According to some embodiments, the controller 1230 may determine whether user consent is required for specific information stored in the UE 1200, and display the corresponding information on the screen display unit 1250.

In addition, the controller 1230 may control the UE 1200 to perform an operation corresponding thereto. According to some embodiments, the controller 1230 may include an LPA in charge of driving and controlling the eUICC, and an application in which the LPA is integrated. In addition, according to some embodiments, the controller 1230 may include a UE framework that process a specific command APDU request to a communication processor (CP) by interpreting information received at the LPA or the application or collects some or all of the requested information from the memory 1240 to return the collected information to the LPA or the application.

The controller 1230 may determine to operate in the MEP mode by synthesizing predetermined information obtained from the eUICC 1260 through the UE 1200 and the transceiver 1210 and may return the corresponding information to the eUICC 1260. The eUICC 1260 is controlled by the controller 1230, and according to an embodiment of the present disclosure, the eUICC 1260 may perform each management command and transmit a proactive command to a modem or the like.

The memory 1240 stores data such as a basic program, an application program, and configuration information for the operation of the UE 1200. In the embodiment, the memory 1240 is composed of a storage medium such as ROM, RAM, hard disk, CD-ROM, and DVD, or a combination of the storage media, and may provide data stored as the terminal capability according to the request of the controller 1230. In addition, the memory 1240 may be integrated with the controller 1230 and a system on chip (SoC) and implemented.

Meanwhile, in the embodiment of the present disclosure, the eUICC 1260 may exist as a separate module outside the UE 1200 in a removable manner and may be inserted into the UE 1200. The eUICC 1260 may also be configured to include some or all of other parts other than the screen display unit 1250 in the modules of the UE 1200 therein. For example, according to an embodiment of the present disclosure, the controller of the eUICC 1260 may process and obtain the terminal capability information of the UE 1200 received through the message transceiver, through the message processor, and then may obtain/combine information on whether there is an enabled profile with reference to the state information of the profile stored in the memory and information on the profile configured as the default profile when the corresponding UE is a non-eSIM or MEP-non-support eSIM UE through the corresponding message information, thereby changing and processing the state of the profile in the eUICC 1260. Meanwhile, it should be noted that the UE 1200 may include UICC, eUICC, iSSP, and iUICC as a built-in hardware security module.

The screen display unit 1250 may display information handled/processed by the controller 1230, or display the progress of the operation performed by the UE 1200 through the processing of the controller 1230 or consent to an event requesting the execution from the user, and the like. According to some embodiments, stored profile information, a default profile configuration menu, a default profile input, and an input result may be returned to the user and displayed. According to some embodiments, an LPA or an application in which the LPA is integrated and implemented may include the screen display unit 1250 and the controller 1230.

Figure 13:
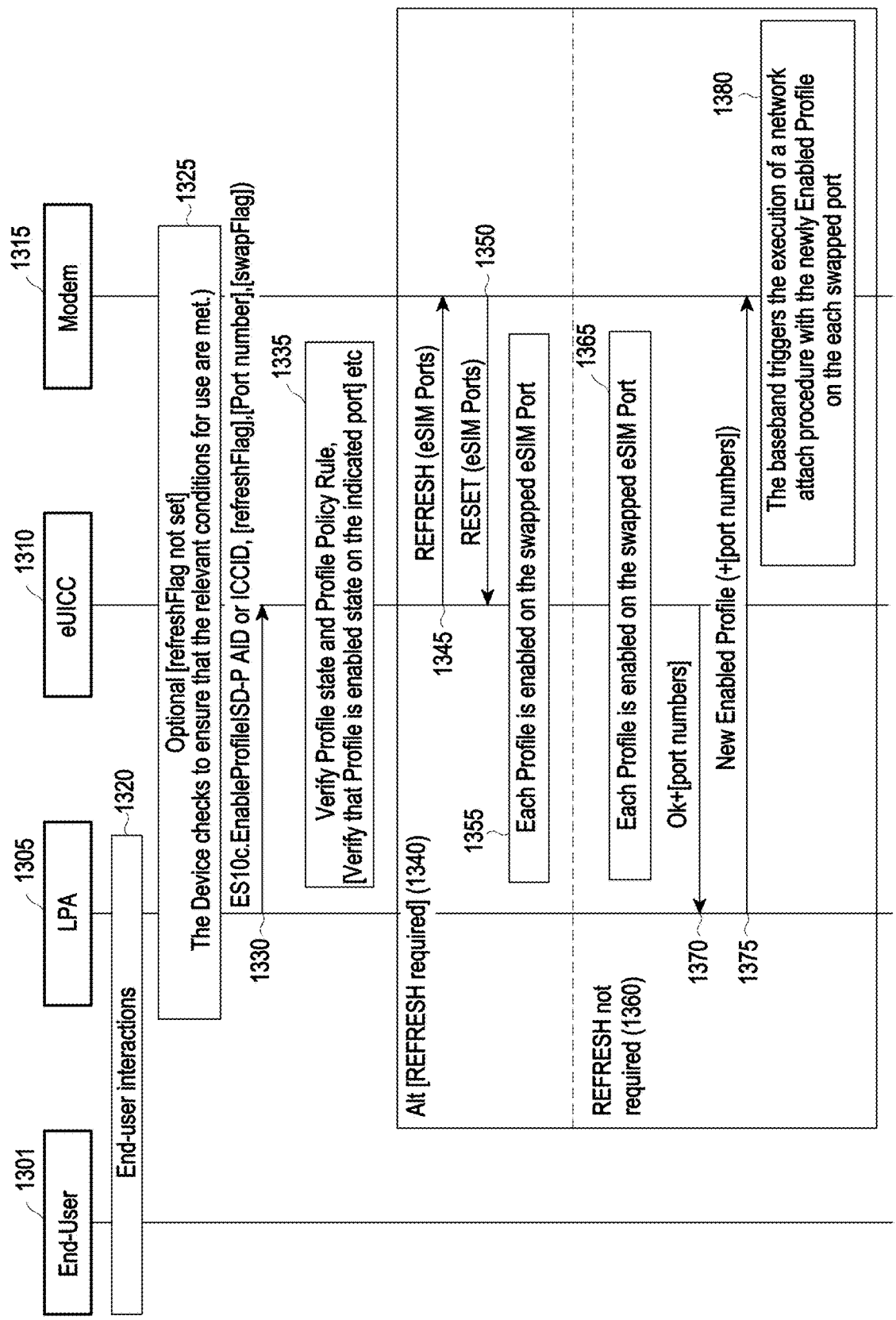
FIG. 13 illustrates a method of processing a change between ports to be used by profiles in a UE and an eUICC operating in an MEP mode according to another embodiment of the present disclosure.

FIG. 13 illustrates a method of processing a change between ports to be used by profiles in a UE and an eUICC operating in an MEP mode according to another embodiment of the present disclosure. In particular, FIG. 13 describes a method of transmitting a command for enabling the profile (ES10c.EnableProfile) including a swap indicator.

In FIG. 4, a procedure for profile activation processing for a specific port in the MEP is described, and in FIG. 13, the swap indicator will be mainly described.

Referring to FIG. 13, when the ES10.EnableProfile command including a swap indicator is transmitted in operation 1330, the eUICC 1310 may not return an error even when a target profile (profile having ICCID of ES10.EnableProfile Command) is enabled, and, additionally, may determines whether another profile is enabled in a target port number to enable the target profile in operation 1335. At this time, when both are enabled, the eUICC 1310 may perform a subsequent procedure for changing the port, otherwise the eUICC 1310 may return an error to the LPA 1305 and terminate the procedure.

When the eUICC 1310 determines that it is possible to change the port of the profile as a result of the determination in operation 1335, the eUICC 1310 marks the port number to be changed and used by the profiles on information of the profiles to change the ports before requesting the refresh command to the modem 1315 in operation 1345.

When refreshFlag is configured in ES10c.EnableProfile Command in operation 1340, the eUICC 1310 may transmit a REFRESH proactive command for the ports to be changed to the modem 1315 in operation 1345. As described above in FIG. 11, the REFRESH proactive command may be transmitted one by one for each port to which the change is applied, or two proactive commands may be sequentially transmitted through one of the target ports or the ISD-R dedicated port. Alternatively, one proactive command may be transmitted while including a plurality of port numbers. In FIG. 13, a case in which one proactive command is transmitted through the ISD-R dedicated ports while including the plurality of the port numbers is illustrated as an example.

When the proactive command including the plurality of port numbers (2 port numbers due to the port change) is received, the modem 1315 may perform a batch network connection procedure for the networks to which the received port numbers are mapped and use, and may start a new eUICC session through reset for each port after batch deleting the cache values for the ports in operation 1350. When the reset is performed, the eUICC 1310 may map the profile to a marked new port to complete the eUICC initialization procedure in operation 1355.

When refreshFlag is not configured in operation 1360, the eUICC 1310 may change port mapping of the profile to a port number to be enabled as described above in operation 1365. Next, the eUICC 1310 may return a success response message including the port numbers to be changed by each profile to the LPA 1305 in operation 1370. Alternatively, the LPA 1305 may add the port numbers to be changed to the success response message and then may transmit the success response to the modem 1315. The modem 1315 having received the success response including the port numbers to be changed may perform a batch network release procedure for the networks used by each existing profile, delete cache values for the changed ports, process reset for the changed ports in operation 1375. After performing reset, the modem 1315 may perform a network connection procedure in the basebands connected to the changed port by using the profile information enabled for the changed port in operation 1380.

As described above, when the MEP-support eUICC has been inserted into the first UE and operated in the MEP mode before being inserted into the second UE, two or more profiles may exist in the eUICC inserted into the second UE and a state in which two or more profiles are all enabled may be obtained.

As described above in operation 830 of FIG. 8 and in FIG. 9, when the eUICC has received information on eUICC-related capability as information on terminal capability of the UE, but does not receive information on MEP support of the UE as the information on the terminal capability or information received from the UE though a separate APDU, the eUICC maintains only the default profile for baseband connection in the enabled state, and implicitly disables other enabled profile(s).

However, as to the configuration of the MEP-support eUICC, it may be possible to maintain and process all the states of the profiles in the eUICC in an enabled state. For example, when profile A, profile B, and profile C exist as three profiles in the eUICC inserted into the second UE and all three profiles are enabled, even if only the profile (e.g., profile A) configured as the default profile in the eUICC during the UE-eUICC initialization process is processed with baseband associativity, the eUICC may maintain state information of the remaining profiles (e.g., profile B, profile C) in the enabled state without arbitrarily changing the state of the remaining profiles to be disabled. In this case, the eUICC maintains the state of profile B and profile C in the enabled state, but network access is not possible because there is no baseband connection. Accordingly, the eUICC may process the profile B and the profile C as the disabled state defined in GSMA SGP.22. In the present disclosure, this state may be described as a "temporarily enabled state" for convenience of description.

As described above, initialization of the profiles in the eUICC may be completed in a SEP mode in the enabled state but in a state in which channels for baseband connections are not provided from the modem. As described above, for profiles in a state in which the profiles are enabled but the baseband connections are not present, the eUICC may mark identification information for a "temporarily enabled state" in the state information of the profiles and store the corresponding result. The corresponding time point when the eUICC may mark the identification information for a "temporarily enabled state" in the state information of the profiles and store the corresponding result may be a specific time point of initialization between the UE and the eUICC.

As a method of marking and storing identification information, a method of indicating, by the eUICC, the temporarily enabled state as a new state value or a method of using, by the eUICC, a separate identifier indicating the temporarily enabled state may also be possible. For example, it is possible to add temporaryEnabled(2) as one of ProfileState values included in ProfileInfo (ProfileState::=INTEGER {disabled(0), enabled(1), temporaryEnabled(2)}), or add an identifier such as temporaryEnabled Flag to ProfileInfo as additional data.

Figure 14:
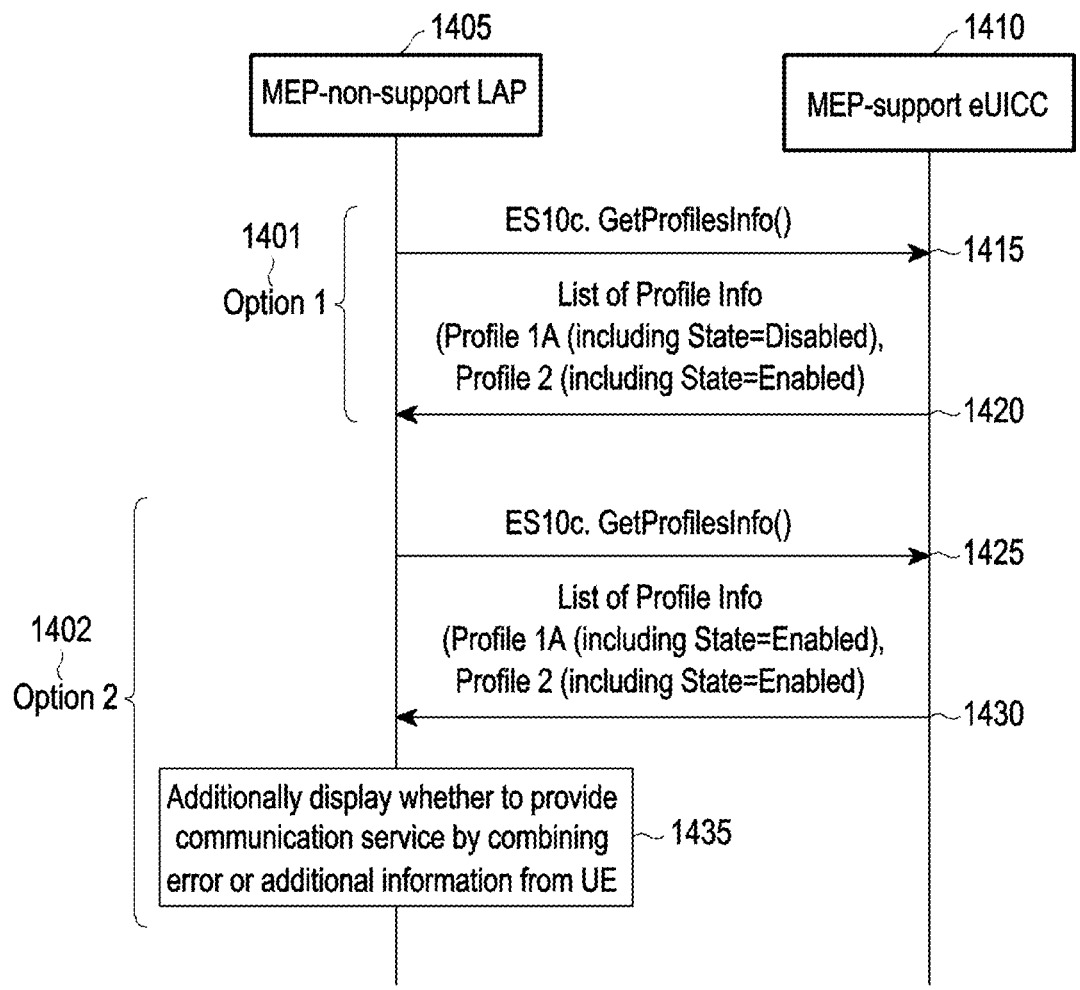
FIG. 14 illustrates a method of returning profile status information when a removable MEP-support eUICC is inserted into an MEP-non-support eSIM UE according to an embodiment of the present disclosure.
Figure 15:
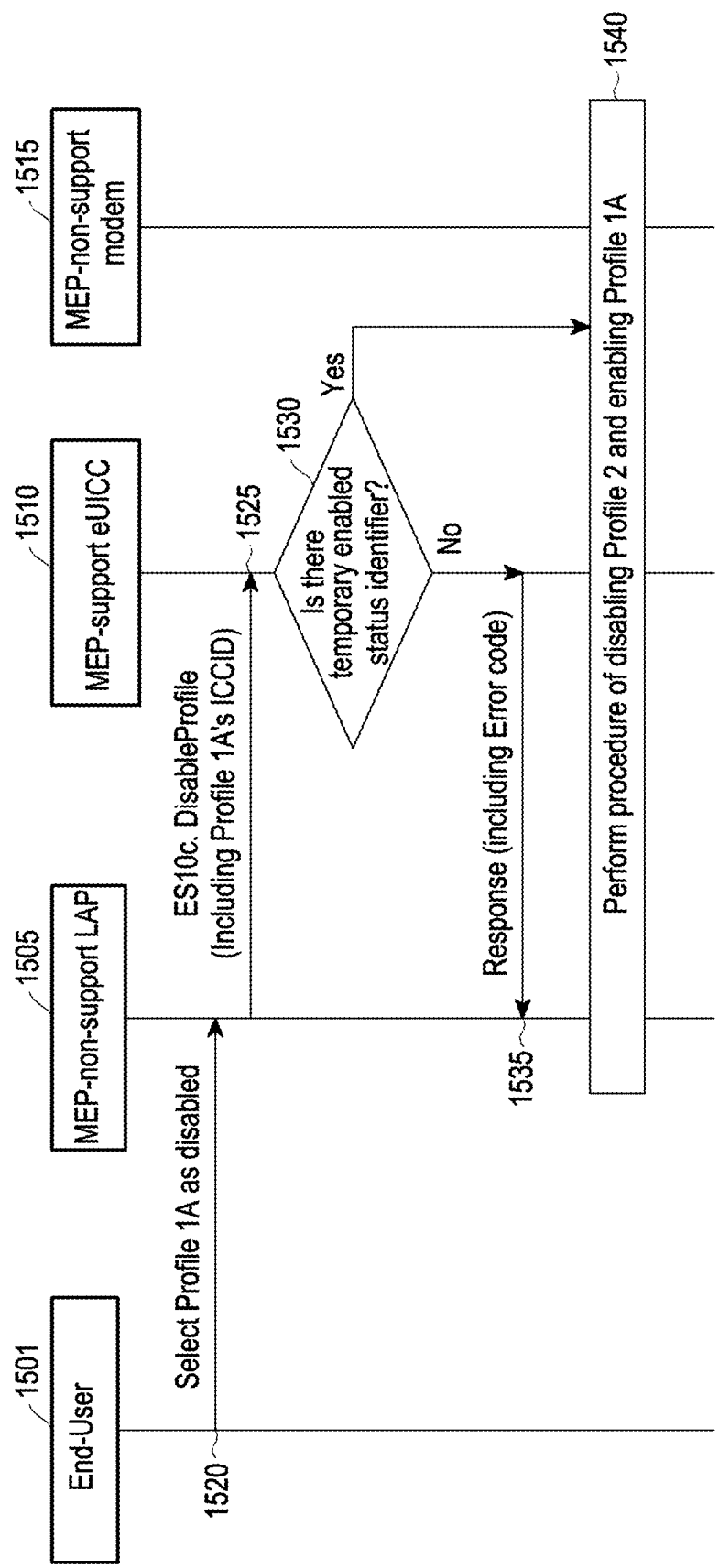
FIG. 15 illustrates a method of processing activation of a profile that is in a temporarily enabled state when a removable MEP-support UICC is inserted into an MEP-non-support eSIM UE according to an embodiment of the present disclosure.
Figure 16:
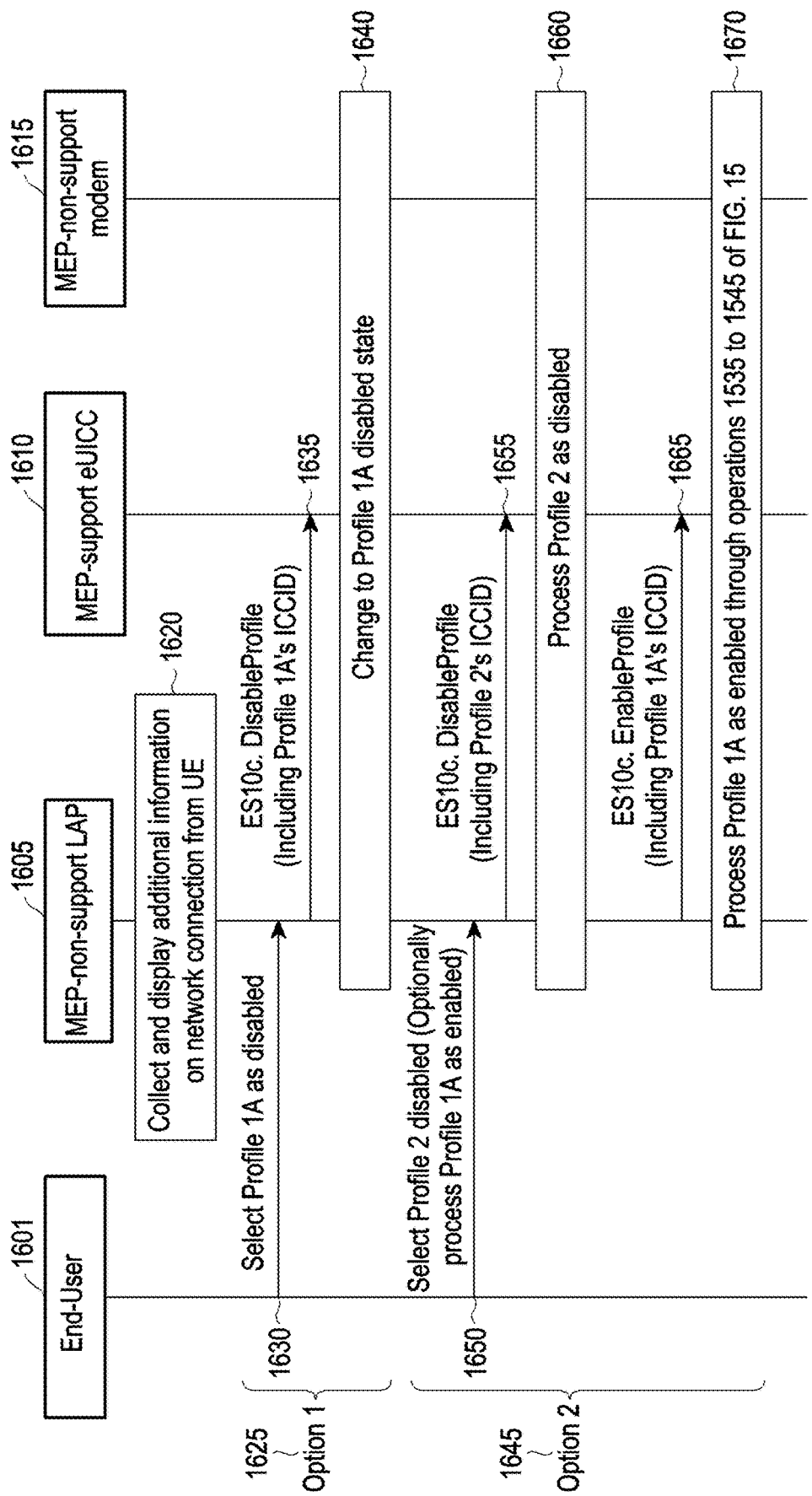
FIG. 16 illustrates a method of processing deactivation of a profile that is in a temporarily enabled state when a removable MEP-support UICC is inserted into an MEP-non-support eSIM UE according to an embodiment of the present disclosure.

In FIGS. 14 to 16, a profile in a "temporarily enabled state" that is not connected to a baseband even though the state of the profile is maintained in the enabled state during the initialization process is referred to as profile 1A. In addition, unless otherwise specified, the LPA in FIGS. 14 to 16 refers to an MEP-non-support LPA, and a modem refers to an MEP-non-support modem.

FIG. 14 illustrates a method of returning profile status information when a removable MEP-support eUICC is inserted into an MEP-non-support eSIM UE according to an embodiment of the present disclosure.

As described above, initialization of the profiles in the eUICC may be completed in the SEP mode in the enabled state but in a state in which channels for baseband connections are not provided from the modem. As described above, for a profile in a state in which the profile is enabled but in a state in which there is no baseband connection, the eUICC may mark, store, and use the state information of the corresponding profile.

Referring to FIG. 14, in option 1 (1401), a non-MEP LPA 1405 in the SEP mode may request ES10c.GetProfileInfo( ) to an MEP-support eUICC 1410 to obtain profile information in operation 1415. The eUICC 1410 having received the request for the profile information from the LPA 1405 may return the state information of the profile to the LPA 1405 as the profile information in operation 1420.

When two profiles (e.g., profile 1A and profile 2) exist in the eUICC, the eUICC 1410 may identify whether identification information indicating that the states of the profile 1A and the profile 2 are the temporarily enabled states is marked.

Among the values included in ProfileInfo of the profile 1A, for example:
1. ProfileState=temporaryEnabled(2) or
2. ProfileState=enabled(1) and temporaryEnabled Flag are configured.

When information on the temporarily enabled state is marked as shown in the above, the eUICC 1410 returns the corresponding information to the LPA 1405 as it is when operating in the MEP mode, and may change both the above cases 1 and 2 to ProfileState=disabled(0) to return to the LPA 1405 when not operating in the MEP mode. For example, the eUICC 1410 may mark the corresponding information as Profile 1A State=Disabled, Profile 2 State=Enabled and may return the marked information to the LPA 1405. The LPA 1405 may mark the profile list and the state information to the user by referring to predetermined information such as profile information obtained from the eUICC 1410 through ES10c.GetProfileInfo( ) and radio access information received from the UE.

Continuing to refer to FIG. 14, in option 2 (1402), when the eUICC 1410 receives ES10c.GetProfileInfo( ) from the LPA 1405 in operation 1425, the state information of the profile may be included as profile information and may be returned to the LPA 1405 in operation 1430.

In this case, when two profiles (e.g., profile 1A and profile 2) exist in the eUICC 1410, the eUICC 1410 may identify whether identification indicating the states of the profile 1A and the profile 2 are in the temporarily enabled state is marked.

Among the values included in ProfileInfo of Profile 1A, for example:
1. ProfileState=temporaryEnabled(2) or
2. ProfileState=enabled(1) and temporaryEnabled Flag are configured.

When the identification information on the temporarily enabled state is marked as shown in the above, the eUICC 1410 returns the corresponding information to the LPA 1405 as it is when operating in the MEP mode, and may change both the above cases 1 and 2 to ProfileState=enabled(1) to return to the LPA 1405 when not operating in the MEP mode. For example, the eUICC 1410 may mark the corresponding information as Profile 1A State=Enabled, Profile 2 State=Enabled, and may return the marked information to the LPA 1405. The LPA 1405 may display the profile list and the state information to the user in operation 1435 by referring to predetermined information such as profile information obtained from the eUICC 1410 through ES10c.GetProfileInfo( ) and radio access information received from the UE. On the other hand, in the case of an MEP-non-support LPA, the LPA 1405 may be implemented such that only one value for which the profile state is returned as "enable" is possible.

In this case, when there are two or more "enabled," the MEP-non-support LPA may recognize this as an error, and may combine predetermined information obtained from the UE, for example, the baseband allocated for each profile or IMEI information to configure and show the combined information to the user, so that the user can determine the deactivation process of one profile with reference to the corresponding information. Upon receiving the user's input, the LPA 1405 may transmit ES10c.disableProfile to the eUICC 1410 to process explicit deactivation of one profile. This will be further described in the example of FIG. 16 below.

FIG. 15 illustrates a method of processing activation of a profile that is in a temporarily enabled state when a removable MEP-support UICC is inserted into an MEP-non-support eSIM UE according to an embodiment of the present disclosure.

As in the embodiment of FIG. 14, an LPA 1505 may collect profile information and display the collected information to an end-user 1501, and the end-user 1501 may identify and change the state of a specific profile through the displayed profile information.

Referring to FIG. 15, the end-user 1501 may execute an input to the LPA 1505 to receive a network service through the profile 1A instead of the profile 2 at a specific time with reference to the marked profile list and profile state information. As an example, it is possible for the end-user 1510 to select the profile 1A for the use of the communication service in the LPA 1505 in operation 1520. Through the user input, the LPA 1505 may transmit a profile activation request command to the eUICC 1510. For example, the LPA 1505 may transmit the ES10c.EnableProfile command including the ICCID of the profile 1A to the eUICC 1510 in operation 1525.

After receiving the ES10c.EnableProfile command including the ICCID from the LPA 1505, in operation 1530, the eUICC 1510 may determine whether identification information on the temporarily enabled state additionally exists in the process of verifying whether the profile activation process is possible.

When the identification information for the temporarily enabled state does not exist, the MEP-support eUICC 1510 may return an error code to the LPA 1505 as a processing result in operation 1535. The error code may be one of profileNotInDisabledState, disallowedByPolicy, or UndefinedError.

When the identification information indicating that the profile is temporarily activated is marked in the profile information stored and managed by the eUICC 1510, the eUICC 1510 does not return the error code, but may recognize the corresponding information as a profile activation procedure defined in GSMA SGP.22, then may implicitly disable the profile 2, and may process the profile 1A to be in the enabled state in operation 1535. As an example, the profile 1A may be processed as in the profile activation procedure defined in the above-described GSMA SGP.22, and when the refresh Flag is configured, for example, the following procedure may be included for processing.

Step 1. In the eUICC 1510, the state of the profile 1A may be marked as a "to be enabled" state, and the state of the profile 2 may be marked as a "to be disabled" state.

Step 2. A REFRESH proactive command <mode=Profile State Change or eUICC Memory Reset> may be transmitted from the eUICC 1510 to the modem 1515.

Step 3. The modem 1515 may request a terminal response or reset to the eUICC 1510 after deleting cached information on the profile 2 and performing a network detach procedure.

Step 4. When the modem-eUICC is initialized, the eUICC 1510 may perform a state change process for the profile 1A from a "temporarily enabled state" to an enabled state and for the profile 2 to a disabled state.

FIG. 16 illustrates a method of processing deactivation of a profile that is in a temporarily enabled state when a removable MEP-support UICC is inserted into an MEP-non-support eSIM UE according to an embodiment of the present disclosure.

Referring to FIG. 16, as in the embodiment of FIG. 14, an MEP non-support LPA 1605 may display information for managing the profile by an end-user 1601 on a user screen with reference to information of the profile received from the eUICC 1610 and, additionally, information collected from the UE in operation 1620. In a case in which the MEP-support eUICC 1610 receives GetProfileInfo( ) from the LPA 1605, when the MEP-support eUICC 1610 returns the profile in the temporarily enabled state as Profile 1A State=Enabled, the LPA 1605 may receive the state of two or more profiles configured in the enabled state. In this case, since it may cause interference to the end-user 1601 as if two basebands are available, the LPA 1605 may process profile information for the end-user 1601 in the following methods.

In one embodiment, a method in which, as the states of two or more profiles are received in an enabled state, an error occurs, and a screen requesting deactivation of one profile from the end-user 1601 is displayed to request the change of the state of one profile to the disabled state by the end-user.

In one embodiment, a method of notifying the end-user that only one profile is available for network use by indicating additional information indicating that the profile is not connected to the network, when it is identified that a corresponding profile is a profile in which a baseband is not assigned through predetermined information received from the UE, that is, information indicating whether the corresponding profile is connected to a radio access network while the state of the received profile is indicated as it is as the two enabled states.

When the end-user 1601 selects the profile 1A at a specific time point and wants to enable the selected profile 1A in a network usable state for a communication service, processing is performed according to the procedure of the embodiment of FIG. 15.

Referring to FIG. 16, in option 1 (1625), at a specific time point, the end-user 1601 may select the profile 1A to change the profile state to an enabled state in operation 1630. For example, when the LPA 1605 detects activation of two or more profiles in operation 1620 and requests deactivation of one of the two enabled profiles to the end-user 1601, the end-user 1601 may select the profile 1A. Upon receiving the input of the end-user 1601, the LPA 1605 may request the state change of the profile 1A to the eUICC 1610 by transmitting an ES10c.DisableProfile command including the ICCID of the profile 1A to the eUICC 1610 according to the procedure defined in SGP.22 for changing the state of the profile in operation 1635. An ISD-R (not shown) of the eUICC 1610 having received the ES10c.DisableProfile command may change the state of the profile 1A to the disabled state, and may return a result of the deactivation change process to the LPA 1605. At this time, since the profile 1A is not previously connected to the network, the eUICC 1610 may omit a refresh processing request to an MEP-non-support modem 1615 according to the state change directly (or through the LPA 1605) in operation 1640.

Continuing to refer to FIG. 16, in option 2 (1645), the end-user 1601 may select the profile 2 to change the profile state to a disabled state at a specific time point in operation 1650. For example, when the LPA 1605 detects activation of two or more profiles in operation 1620 and requests deactivation of one of the two enabled profiles to the end-user 1601, the end-user 1601 may select the profile 2. At this time, the end-user 1601 may disable only the profile 2, or may provide, to the LPA 1605, user consent for the activation processing of the profile 1A while disabling the profile 2 in operation 1650, so that the LPA 1605 may determine whether to additionally process the activation of the profile 1A and perform processing.

When the end-user 1601 determines to disable only the profile 2, the LPA 1605 may request the state change of the profile 2 by transmitting the ES10c.DisableProfile command including the ICCID of the profile 2 to the eUICC 1610 according to the procedure defined in SGP.22 for changing the profile state in operation 1655. The ISD-R (not shown) of the eUICC 1610 having received the ES10c.DisableProfile command may change the state of the profile 2 to the disabled state, and may return a processing result according to the state change to the LPA 1605. At this time, since Profile 2 is not previously connected to the network, the eUICC 1610 may directly (or through the LPA 1605) perform a refresh processing request according to the state change to the modem 1615 in operation 1660.

When the end-user 1601 determines to enable the profile 1A while disabling the profile 2, the LPA 1605 may perform operations 1655 and 1660 and additionally transmit the ES10c.EnableProfile command including the ICCID of the profile 1A to the eUICC 1610 to request a state change of the profile 1A in operation 1665. The eUICC 1610 having received the ES10c.EnableProfile command including the ICCID of profile 1A may identify whether to process identification information on a temporarily enabled state as in operations 1525 to 1535 of the embodiment of FIG. 5 in operation 1670. On the other hand, not limited to the non-MEP UE, when the MEP-support eUICC 1610 is inserted into the UE operating in the MEP mode, in the case of completing the eUICC initialization by maintaining the enabled state without changing the profile to the disabled state according to the configuration of the eUICC 1610, when a profile activation process is requested from the MEP-support LPA after being marked as temporarily activated state, the identification information on the temporarily enabled state may be identified to determine whether to enable the profile or whether to return an error.

It should be appreciated that various embodiments of the present disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., program) including one or more instructions that are stored in a storage medium (e.g., internal memory or external memory) that is readable by a machine (e.g., electronic device). For example, a processor of the machine (e.g., electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively, or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

In the above-described detailed embodiments of the present disclosure, an element included in the present disclosure is expressed in the singular or the plural according to presented detailed embodiments. However, the singular form or plural form is selected appropriately to the presented situation for the convenience of description, and the present disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE), the method comprising:
   receiving, from an embedded universal integrated circuit card (eUICC) in the UE, an answer to reset (ATR) message including first information indicating support of at least one eUICC functionality and second information indicating support of a multiple enabled profiles (MEP) mode;
   determining a transport protocol to be used between the UE and the eUICC in the UE based on the received ATR message;
   transmitting, to the eUICC in the UE, an application protocol data unit (APDU) message including information indicating whether the UE supports eUICC-related capability through the transport protocol;
   receiving, from the eUICC in the UE, a response message including a response code in response to transmitting the APDU message;
   transmitting, to the eUICC in the UE, a command APDU message for a channel open, which is used in an initialization operation between an eUICC not supporting an MEP mode and the UE, in case that the UE is to operate in a non-MEP mode;
   receiving, from the eUICC in the UE, a response message to generate a channel between the UE and the eUICC in the UE for an APDU transmission in response to the command APDU message; and
   performing the initialization operation in the non-MEP mode between the eUICC in the UE and the UE.

2. The method of claim 1, wherein the ATR message further includes information on a transport protocol supported by the eUICC in the UE and information indicating whether the transport protocol supported by the eUICC in the UE is changeable.

3. The method of claim 1, wherein the eUICC-related capability includes information whether the UE supports the MEP mode.

4. The method of claim 1, further comprising:
   selecting a master file (MF) of the eUICC in the UE after receiving the ATR message.

5. The method of claim 2, wherein determining the transport protocol to be used between the UE and the eUICC in the UE comprises:
   determining whether the transport protocol supported by the eUICC in the UE is changeable based on the ATR message;
   in case that it is determined that the transport protocol supported by the eUICC in the UE is not changeable, determining the transport protocol to be used between the UE and the eUICC in the UE as a transport protocol supported by the eUICC in the UE; and
   in case that it is determined that the transport protocol supported by the eUICC in the UE is changeable, transmitting, to the eUICC in the UE, a request for determining the transport protocol to be used between the UE and the eUICC in the UE.

6. The method of claim 1, wherein performing the initialization operation between the eUICC in the UE and the UE comprises:
   transmitting, to the eUICC in the UE, a select command including an identifier of an issuer security domain-root (ISD-R) of the UE; and
   receiving, from the eUICC in the UE, a response including information indicating whether at least one enabled profile is in the eUICC in the UE, corresponding to the ISD-R.

7. A user equipment (UE), the UE comprising:
   memory storing instructions; and
   processing circuitry coupled to the memory and configured, based at least partially on execution of the instructions, to cause the UE to:
   receive, from an embedded universal integrated circuit card (eUICC) in the UE, an answer to reset (ATR) message including first information indicating support of at least one eUICC functionality and second information indicating support of a multiple enabled profiles (MEP) mode,
   determine a transport protocol to be used between the UE and the eUICC in the UE based on the received ATR message,
   transmit, to the eUICC in the UE, an application protocol data unit (APDU) message including information indicating whether the UE supports eUICC-related capability through the transport protocol,
   receive, from the eUICC in the UE, a response message including a response code in response to transmitting the APDU message,
   transmit, to the eUICC in the UE, a command APDU message for a channel open, which is used in an initialization operation between an eUICC not supporting an MEP mode and the UE, in case that the UE is to operate in a non-MEP mode,
   receive, from the eUICC in the UE, a response message to generate a channel between the UE and the eUICC in the UE for an APDU transmission in response to the command APDU message, and
   perform the initialization operation in the non-MEP mode between the eUICC in the UE and the UE.

8. The UE of claim 7, wherein the ATR message further includes information on a transport protocol supported by the eUICC in the UE and information indicating whether the transport protocol supported by the eUICC in the UE is changeable.

9. The UE of claim 7, wherein:
   the eUICC-related capability includes information whether the UE supports the MEP mode; and
   the processing circuitry is further configured to cause the UE to select a master file (MF) of the eUICC in the UE after receiving the ATR message.

10. The UE of claim 9, wherein the processing circuitry is further configured to cause the UE to:
    determine whether the transport protocol supported by the eUICC in the UE is changeable based on the ATR message;
    in case that it is determined that the transport protocol supported by the eUICC in the UE is not changeable, determine the transport protocol to be used between the UE and the eUICC in the UE as a transport protocol supported by the eUICC in the UE; and
    in case that it is determined that the transport protocol supported by the eUICC in the UE is changeable, transmit, to the eUICC in the UE, a request for determining the transport protocol to be used between the UE and the eUICC in the UE.

11. The UE of claim 7, wherein the processing circuitry is further configured to cause the UE to:
 transmit, to the eUICC in the UE, a select command including an identifier of an issuer security domain-root (ISD-R) of the UE; and
 receive, from the eUICC in the UE, a response including information indicating whether at least one enabled profile is in the eUICC in the UE, corresponding to the ISD-R.

* * * * *